(12) United States Patent
Kariyama

(10) Patent No.: US 6,684,982 B2
(45) Date of Patent: Feb. 3, 2004

(54) CABLE DISC BRAKE WITH MANUAL WEAR ADJUSTMENT MECHANISM

(75) Inventor: Osamu Kariyama, Sakai (JP)

(73) Assignee: Shimano Inc.

( * ) Notice: Subject to any disclaimer, the term of this patent is extended or adjusted under 35 U.S.C. 154(b) by 0 days.

(21) Appl. No.: 10/092,935

(22) Filed: Mar. 8, 2002

(65) Prior Publication Data

US 2003/0168293 A1 Sep. 11, 2003

(51) Int. Cl.[7] ............................................. F16D 55/00
(52) U.S. Cl. ................... 188/71.7; 188/196 M
(58) Field of Search ............................ 188/196 R, 202, 188/196 M, 196 B, 196 BA, 71.7

(56) References Cited

U.S. PATENT DOCUMENTS

| | | | | |
|---|---|---|---|---|
| 3,878,921 A | * | 4/1975 | Kibler et al. ................. | 188/26 |
| 3,997,033 A | * | 12/1976 | Bulmer ...................... | 188/72.7 |
| 4,029,179 A | * | 6/1977 | Butz ......................... | 188/71.8 |
| 4,102,440 A | * | 7/1978 | Wood ........................ | 188/72.7 |
| 4,319,669 A | * | 3/1982 | Watanabe .................... | 188/72.8 |
| 4,390,084 A | * | 6/1983 | Haraikawa et al. .......... | 188/71.7 |
| 4,633,978 A | * | 1/1987 | Hoff ......................... | 188/71.7 |
| 5,000,294 A | * | 3/1991 | Hunnicutt et al. ........... | 188/71.9 |
| 5,979,609 A | * | 11/1999 | Tsai .......................... | 188/26 |
| 6,019,199 A | * | 2/2000 | Heidenreich ............. | 188/73.34 |
| 6,334,513 B1 | * | 1/2002 | Chern ........................ | 188/71.7 |
| 6,340,074 B1 | * | 1/2002 | Lumpkin et al. ............. | 188/26 |
| 2001/0030088 A1 | | 10/2001 | Lumpkin et al. | |

FOREIGN PATENT DOCUMENTS

| | | |
|---|---|---|
| DE | 201 04 0464 U1 | 7/2001 |
| WO | WO 99/47409 A1 | 9/1999 |

* cited by examiner

Primary Examiner—Jack Lavinder
Assistant Examiner—Benjamin A. Pezzlo
(74) Attorney, Agent, or Firm—Shinjyu Global IP Counselors, LLP

(57) ABSTRACT

A bicycle cable disc brake is provided a disc brake pad adjustment mechanism to adjust the spacing between the friction pads. Basically, the cable disc brake has a first caliper housing portion containing a cable actuated mechanism, and a second caliper housing portion containing the disc brake pad adjustment mechanism. The disc brake pad adjustment mechanism has a caliper housing portion, an adjusting axle, an adjusting plate and an adjustment biasing member. The adjusting axle movably is coupled to the caliper housing portion to rotate about a longitudinal axis of the adjusting axle. The adjusting plate is coupled to the adjusting axle to move axially along the longitudinal axis of the adjusting axle upon rotation of the adjusting axle relative to the caliper housing portion. The adjustment biasing member is operatively disposed between the caliper housing portion and the adjusting axle and arranged to axially urge the adjusting axle against the caliper housing portion. The adjusting axle and the caliper housing portion is configured with an indexing arrangement therebetween to selectively retain the adjusting axle in a predetermined angular position about along the longitudinal axis of the adjusting axle relative to the caliper housing portion.

42 Claims, 21 Drawing Sheets

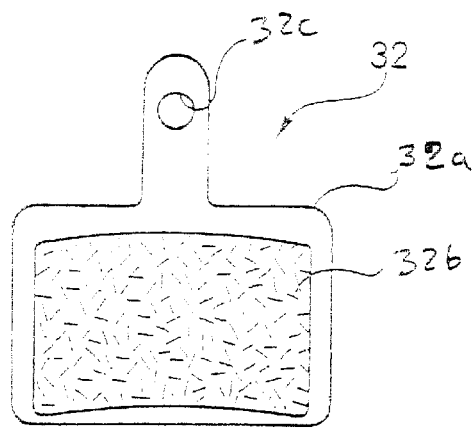
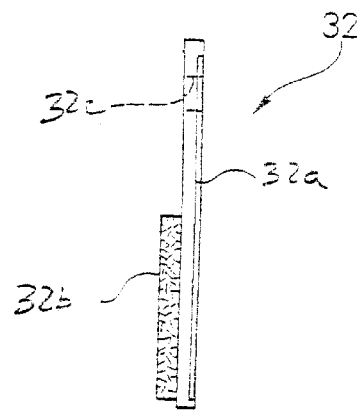
Fig. 15            Fig. 16
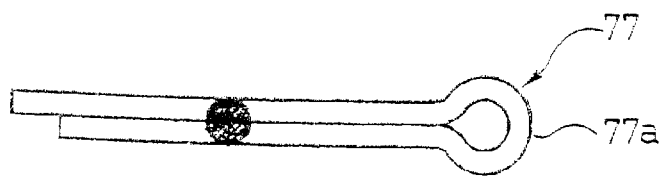
Fig. 17

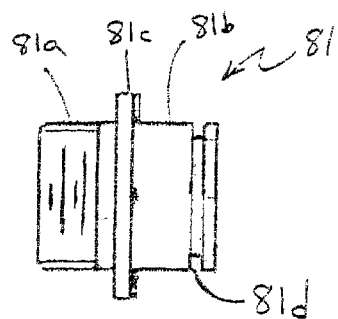
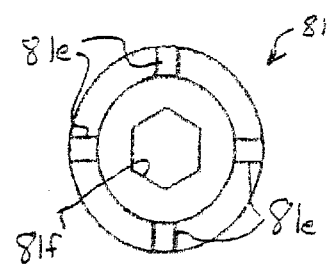
Fig. 22    Fig. 23
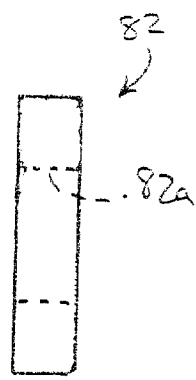
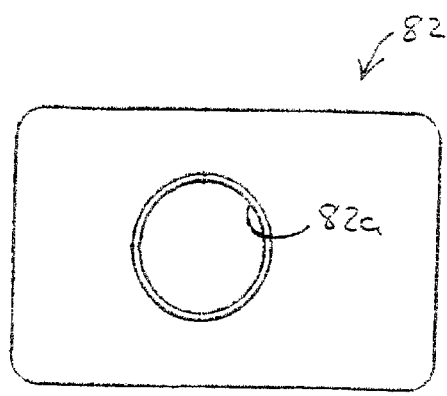
Fig. 24    Fig. 25

 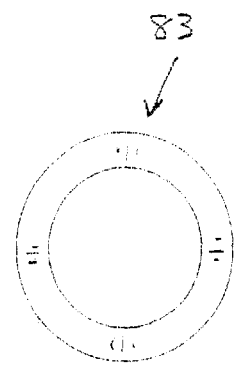
Fig. 26          Fig. 27
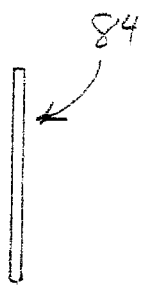 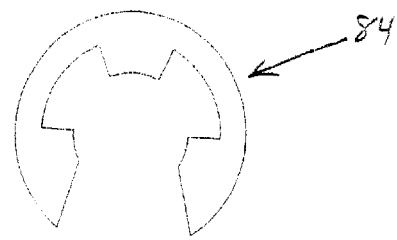
Fig. 28          Fig. 29

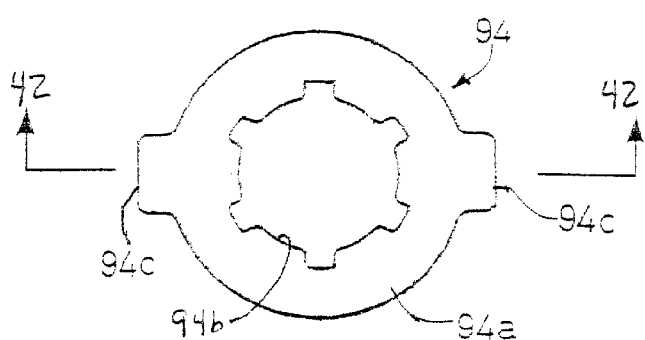
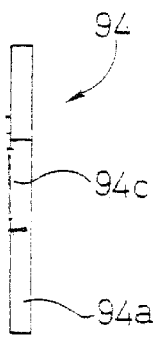
Fig. 40    Fig. 41
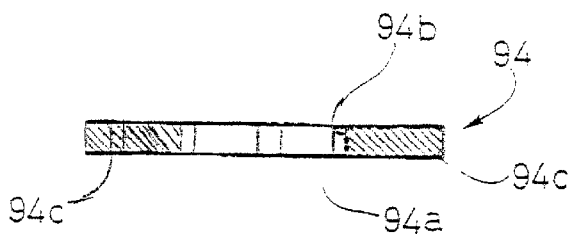
Fig. 42
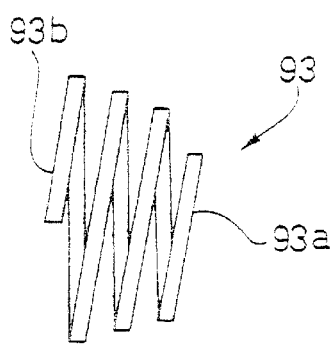
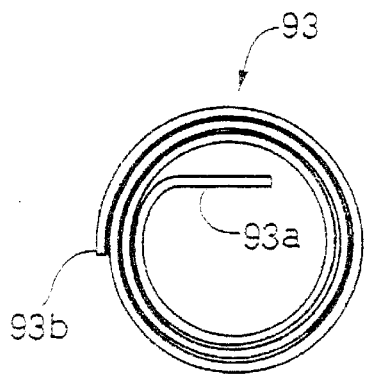
Fig. 43    Fig. 44

CABLE DISC BRAKE WITH MANUAL WEAR ADJUSTMENT MECHANISM

BACKGROUND OF THE INVENTION

1. Field of the Invention

This invention generally relates to a cable operated disc brake for a bicycle. More specifically, the present invention relates to a cable operated disc brake with a disc brake pad adjustment mechanism to adjust the spacing between the friction pads.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle, which has been extensively redesigned over the past years, is the braking systems of bicycles. In particular, the braking power of the braking systems is constantly being increased.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions. Of course, riders constantly desire better performance from disc braking systems, i.e., disc brake systems that have more braking power.

Conventionally, a disc brake is composed of a pair of brake pads that are movably mounted to a caliper housing. The brake pads are pressed against a disc or rotor that is fixed to the wheel to halt the rotation of the disc and thus the wheel. The brake pads are moved toward the disc hydraulically or mechanically such as by a cam mechanism. The hydraulic disc brake systems are typically complicated in construction and expensive to manufacture. Moreover, hydraulic disc brake systems are often quite heavy in construction.

The mechanical disc brake system includes a caliper housing with one brake pad that is fixed to the caliper housing and one brake pad that is movably mounted to the caliper housing by a cam mechanism. A swinging arm is coupled to the cam mechanism to move the movable pad by a cam action. Typically, a conventional brake cable is coupled to a brake lever to move the swinging arm, and thus, operate the cam mechanism. While mechanical disc brake systems are typically less expensive and lighter than hydraulic disc brake systems, mechanical disc brake systems can still be complicated in construction and requires many parts resulting in expensive manufacturing costs, as with a hydraulic disc brake system.

In both hydraulic and mechanical disc brake systems, the brake pads need to be spaced apart by a predetermine distance to receive the rotor between the brake pads. The brake pads should be slightly spaced from the rotor when the brake system is in the non-braking position. It is desirable to control the spacing between the brake pads and the rotor to ensure good braking. Thus, when the brake pads and/or the rotor becomes worn, the spacing between the brake pads and the rotor becomes larger. Thus, the brake pads must be moved farther to engage and stop the rotor.

In view of the above, there exists a need for a disc brake pad adjustment mechanism to adjust the spacing between the friction pads. This invention addresses this need in the prior art as well as other needs, which will become apparent to those skilled in the art from this disclosure.

SUMMARY OF THE INVENTION

One object of the present invention is to provide a disc brake that has a disc brake pad adjustment mechanism to adjust the spacing between the friction pads.

Another object of the present invention is to provide a cable disc brake that is relatively compact and lightweight in relation to the amount of braking power.

Another object of the present invention is to provide a cable disc brake that is relatively inexpensive to manufacture.

The foregoing objects can be basically attained by providing a disc brake pad adjustment mechanism that controls the spacing between a pair of friction pads. The disc brake pad adjustment mechanism has a caliper housing portion, an adjusting axle, an adjusting plate and an adjustment biasing member. The adjusting axle movably is coupled to the caliper housing portion to rotate about a longitudinal axis of the adjusting axle. The adjusting plate is coupled to the adjusting axle to move axially along the longitudinal axis of the adjusting axle upon rotation of the adjusting axle relative to the caliper housing portion. The adjustment biasing member is operatively disposed between the caliper housing portion and the adjusting axle and arranged to axially urge the adjusting axle against the caliper housing portion. The adjusting axle and the caliper housing portion is configured with an indexing arrangement therebetween to selectively retain the adjusting axle in a predetermined angular position about along the longitudinal axis of the adjusting axle relative to the caliper housing portion.

The foregoing objects can also be basically attained by providing a cable disc brake comprising a caliper housing, a first friction pad, a second friction pad, an actuated mechanism, a friction pad biasing member and a disc brake pad adjustment mechanism that controls the spacing between a pair of friction pads. The first friction pad is movably coupled to the caliper housing between a release position and a braking position. The second friction pad is coupled to the caliper housing and arranged substantially parallel to the first end friction member to form a rotor receiving slot therein between. The cable actuated mechanism is movably coupled to the caliper housing to move the first friction pad from the release position towards the second friction pad to the braking position. The disc brake pad adjustment mechanism has an adjusting axle, an adjusting plate and an adjustment biasing member. The adjusting axle movably is coupled to the caliper housing to rotate about a longitudinal axis of the adjusting axle. The adjusting plate is coupled to the adjusting axle to move axially along the longitudinal axis of the adjusting axle upon rotation of the adjusting axle relative to the caliper housing. The adjustment biasing member is operatively disposed between the caliper housing and the adjusting axle and arranged to axially urge the adjusting axle against the caliper housing. The adjusting axle and the caliper housing is configured with an indexing arrangement therebetween to selectively retain the adjusting axle in a predetermined angular position about along the longitudinal axis of the adjusting axle relative to the caliper housing.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 15 is a side elevational view of one of the brake pads for the cable disc brake illustrated in FIGS. 5–8;

FIG. 16 is an edge elevational view of the brake pad illustrated in FIG. 15 for the cable disc brake illustrated in FIGS. 5–8;

FIG. 17 is a side elevational view of the pad assembly pin for the cable disc brake illustrated in FIGS. 5–8;

FIG. 22 is a side elevational view of the adjusting axle for the disc brake pad adjustment mechanism of the cable disc brake illustrated in FIGS. 5–8;

FIG. 23 is an end elevational view of the adjusting axle illustrated in FIG. 22 for the cable disc brake illustrated in FIGS. 5–8;

FIG. 24 is a side elevational view of the adjusting plate for the disc brake pad adjustment mechanism of the cable disc brake illustrated in FIGS. 5–8;

FIG. 25 is an end elevational view of the adjusting plate illustrated in FIG. 24 for the cable disc brake illustrated in FIGS. 5–8;

FIG. 26 is a side elevational view of the adjustment spring for the disc brake pad adjustment mechanism of the cable disc brake illustrated in FIGS. 5–8;

FIG. 27 is an end elevational view of the adjustment spring illustrated in FIG. 26 for the cable disc brake illustrated in FIGS. 5–8;

FIG. 28 is a side elevational view of the retaining member or clip for the disc brake pad adjustment mechanism of the cable disc brake illustrated in FIGS. 5–8;

FIG. 29 is an end elevational view of the retaining member or clip illustrated in FIG. 28 for the cable disc brake illustrated in FIGS. 5–8;

FIG. 40 is an end elevational view of the output cam rotation stopper for the cable disc brake illustrated in FIGS. 5–8;

FIG. 41 is a side edge elevational view of the output cam rotation stopper illustrated in FIG. 40 for the cable disc brake illustrated in FIGS. 5–8;

FIG. 42 is a transverse cross-sectional view of the output cam rotation stopper illustrated in FIGS. 40 and 41 for the cable disc brake illustrated in FIGS. 5–8 as viewed along section lines 42—42 of FIG. 40;

FIG. 43 is an output cam return spring for the front cable disc brake illustrated in FIGS. 5–8;

FIG. 44 is an outside end elevational view of the output cam return spring illustrated in FIG. 43 for the front cable disc brake illustrated in FIGS. 5–8;

DETAILED DESCRIPTION OF THE PREFERRED EMBODIMENTS

Figure 1:
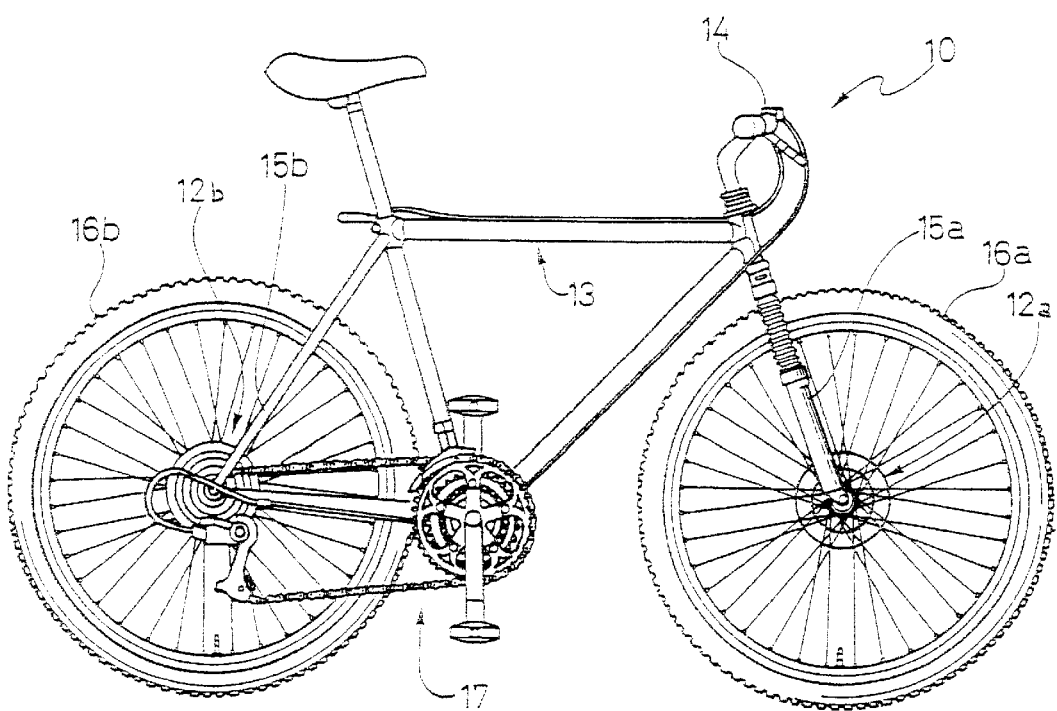
FIG. 1 is a side elevational view of a bicycle with a pair of cable disc brakes coupled thereto in accordance with one embodiment of the present invention.
Figure 2:
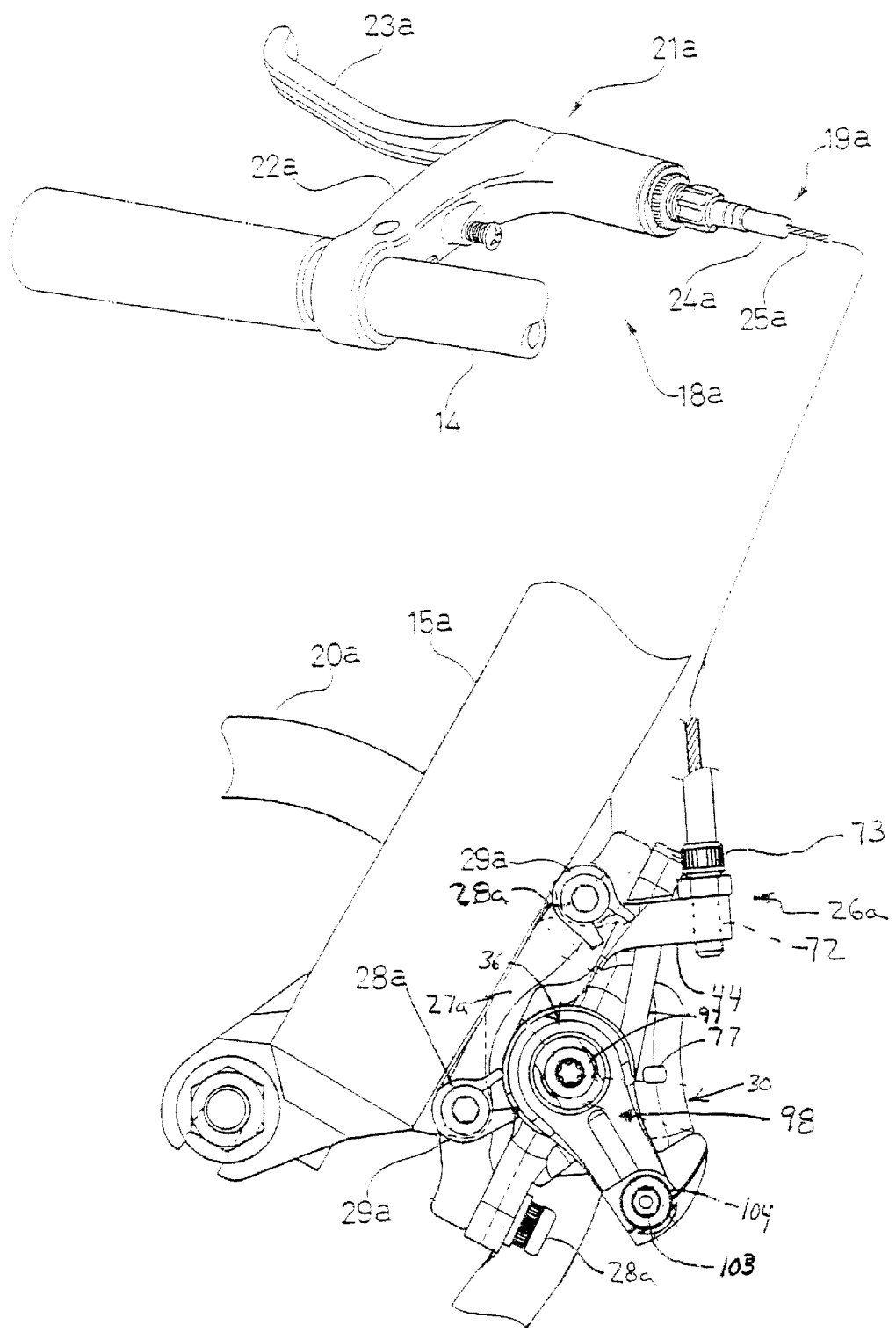
FIG. 2 is a partial side elevational view of a front portion of a bicycle with a front cable disc brake coupled thereto in accordance with one embodiment of the present invention.
Figure 3:
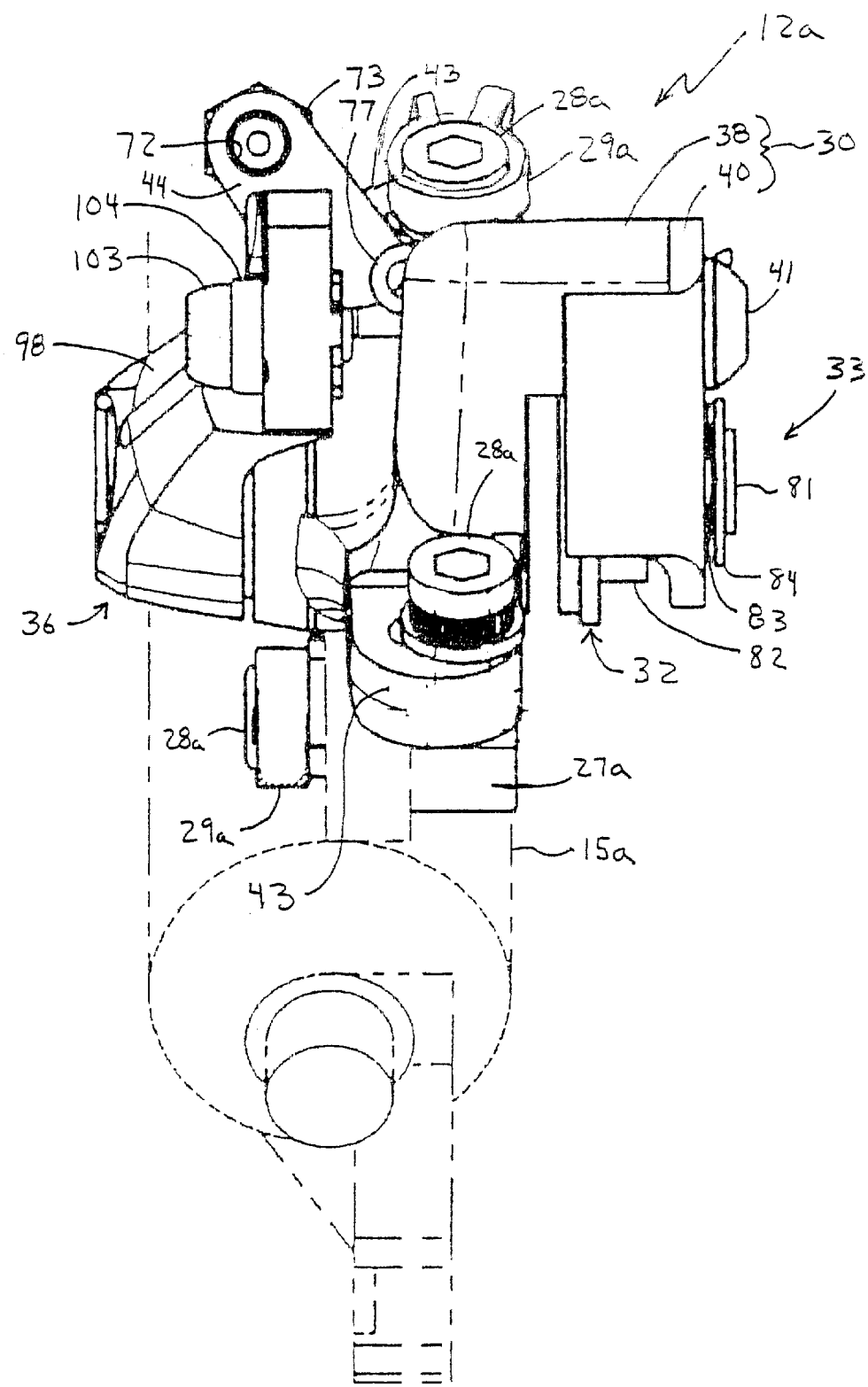
FIG. 3 is an enlarged, partial front elevational view of the front cable disc brake illustrated in FIG. 2.

Referring initially to FIGS. 1–3, front and rear portions of a bicycle 10 are illustrated with a pair of cable disc brakes 12a and 12b coupled thereto in accordance with one embodiment of the present invention. Bicycles such as the bicycle 10 are well known in the art, and thus, the bicycle 10 and its various components will not be discussed or illustrated in detail herein. It will be apparent to those skilled in the art that the bicycle 10 can be any type of bicycle, e.g., mountain bike, a hybrid bike or a road bike. The bicycle 10 is a conventional bicycle, which basically includes a bicycle frame 13 with a handlebar 14, a front 15a, a rear fork 15b, a front wheel 16a, a rear wheel 16b and a drive train 17.

Figure 4:
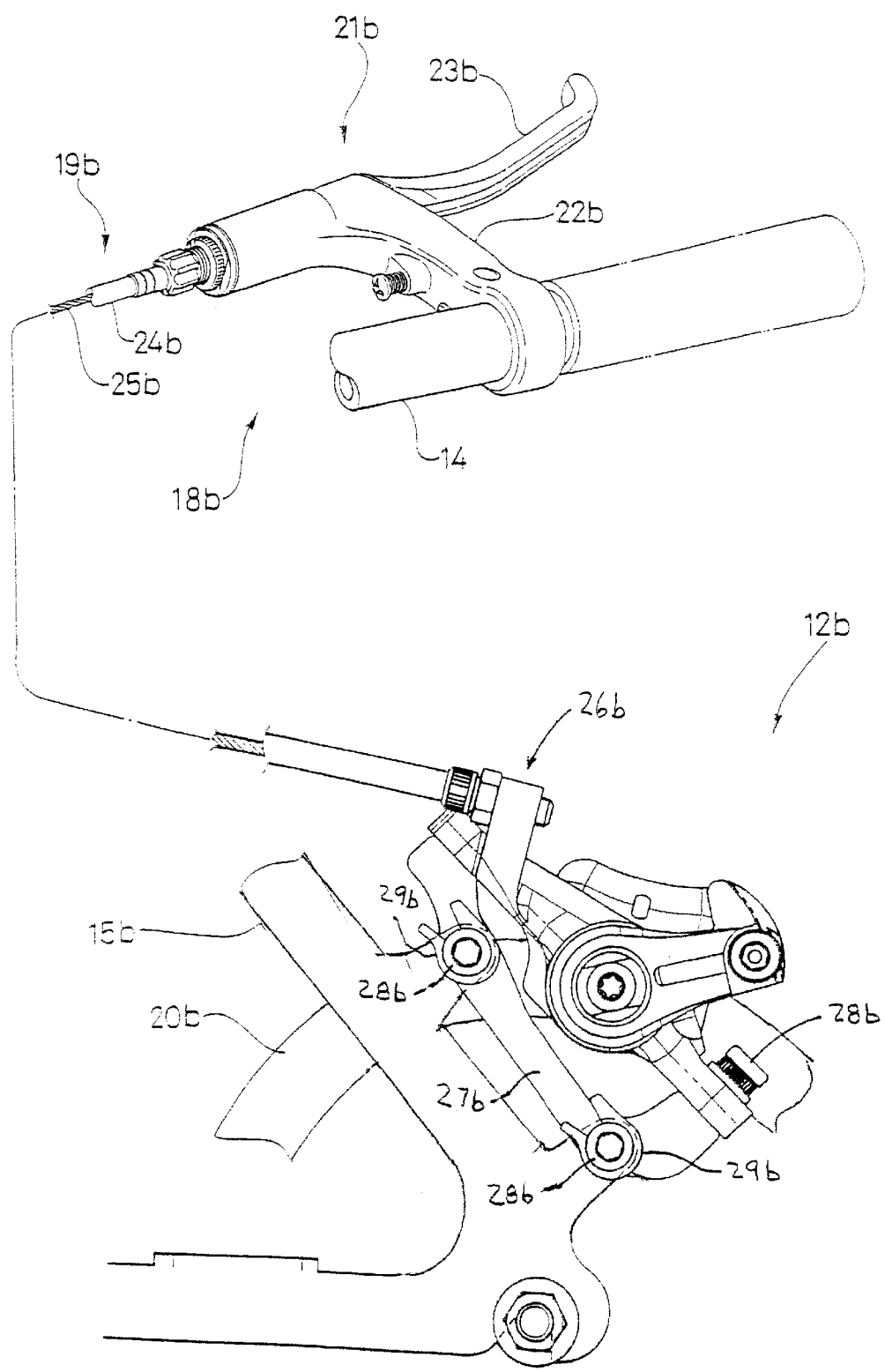
FIG. 4 is a partial side elevational view of a rear portion of a bicycle with a rear cable disc brake coupled thereto in accordance with one embodiment of the present invention.
Figure 5:
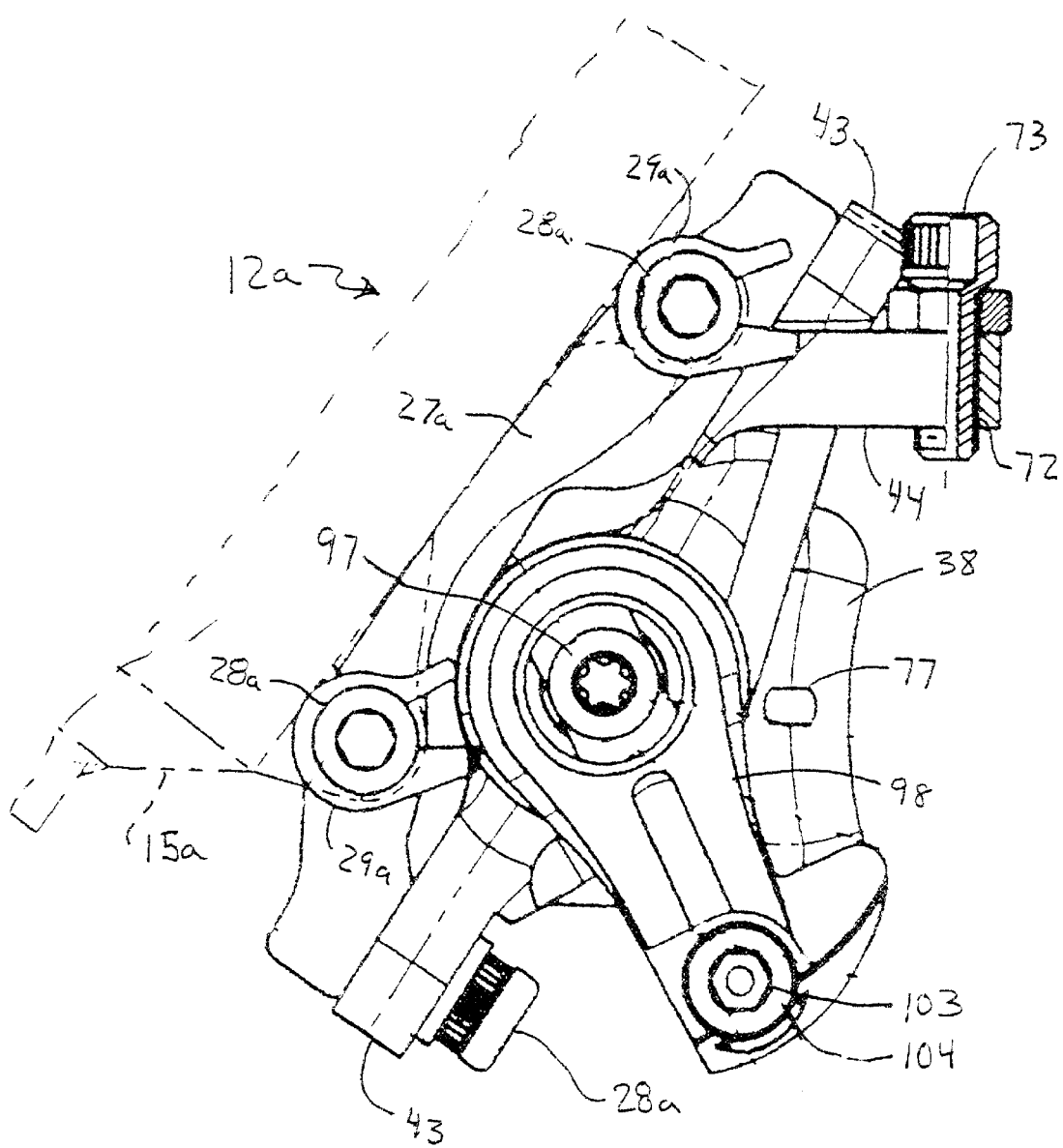
FIG. 5 is an enlarged outside elevational view of one of the cable disc brake in accordance with the embodiment of the present invention illustrated in FIGS. 2–4.

As seen in FIGS. 2–4, the front and rear cable disc brakes 12a and 12b are identical to each other, except for their connections to the bicycle 10 and their respective brake operating mechanisms 18a and 18b. Specifically, the front cable disc brake 12a is mounted to the front fork 15a and operatively coupled to the front brake operating mechanism 18a via a front brake cable 19a. The rear cable disc brake 12b, on the other hand, is coupled to the rear fork 15b and the rear brake operating mechanism 18b via a rear brake cable 19b. The front and rear brake operating mechanisms 18a and 18b are well known in the art, and thus, they will not be discussed or illustrated in detail herein.

Basically, the front brake operating mechanism 18a is designed to actuate the front disc brake 12a to stop rotation of the front wheel 16a. More specifically, the front brake operating mechanism 18a is operatively coupled to the front disc brake 12a by the front brake cable 19a to apply a forcible gripping action on a front disc brake rotor 20a that is fixedly coupled to the front wheel 16a. Likewise, the rear brake operating mechanism 18b is designed to actuate the rear disc brake 12b to stop rotation of the rear wheel 16b. More specifically, the rear brake operating mechanism 18b operatively coupled to the rear disc brake 12b by the rear brake cable 19b to apply a forcible gripping action on a rear disc brake rotor 20b that is fixedly coupled to the rear wheel 16b.

Preferably, the brake operating mechanisms 18a and 18b are mounted on handlebar 14. In particular, as seen in FIGS. 2 and 3, the brake operating mechanism 18a has a brake lever 21a that includes a mounting portion 22a and a lever portion 23a. The mounting portion 22a is designed to be clamped onto the handlebar 14 in a conventional manner. The lever portion 23a is pivotally coupled to the mounting portion 22a for movement between a release position and a braking position. Normally, the lever portion 23a is maintained in a release position in a conventional manner, e.g. by a return spring (not shown).

Likewise, as seen in FIG. 4, the rear brake operating mechanism 18b has a brake lever 21b that includes a mounting portion 22b and a lever portion 23b. The mounting portion 22b is designed to be clamped onto handlebar 14 in a conventional manner. The lever portion 23b is pivotally coupled to mounting portion 22b for movement between a release position and a braking position. Normally, the lever portion 23b is maintained in a release position in a conventional manner, e.g. by a return spring (not shown).

The front and rear brake cables 19a and 19b are well known in the art, and thus, they will not be discussed or illustrated in detail herein. Basically, the front brake cable 19a has an outer casing 24a and an inner wire 25a. The outer casing 24a extends between the mounting portion 22a of the brake lever 21a and an adjusting unit 26a that is mounted on the front cable disc brake 12a. The inner wire 25a is fixedly coupled to the lever portion 23a of the brake lever 21a and a portion of the front cable disc brake 12a as discussed below. Similarly, the rear brake cable 19b has an outer casing 24b and an inner wire 25b. The outer casing 24b extends between the mounting portion 22b of the brake lever 21b and an adjusting unit 26b that is mounted on the rear cable disc brake 12b. The inner wire 25b is fixedly coupled to the lever portion 23b of the brake lever 21b and a portion of the rear cable disc brake 12b in the same manner as in the front cable disc brake 12a discussed below.

Still referring to FIGS. 2 and 3, the front cable disc brake 12a is coupled to the front fork 15a via a mounting bracket 27a and a plurality of bolts 28a. In particular, the mounting bracket 27a is attached to the front fork 15a by two of the bolts 28a and the front cable disc brake 12a is attached to the mounting bracket 27a by two of the bolts 28a. Thus, four bolts 28a secure the front cable disc brake 12a and the mounting bracket 27a to the front fork 15a. Preferably, three of the four bolts 28a have a locking ring 29a coupled to the head portion to prevent rotation thereof.

Similarly, the rear cable disc brake 12b is coupled to the rear fork 15b via a mounting bracket 27b and a plurality of bolts 28b. In particular, the mounting bracket 27b is attached to the rear fork 15b by two of the bolts 28b and the rear cable disc brake 12b is attached to the mounting bracket 27b by two of the bolts 28b. Thus, four bolts 28b secure the rear cable disc brake 12b and the mounting bracket 27b to the rear fork 15b. Preferably, three of the four bolts 28b have a locking ring 29b coupled to the head portion to prevent rotation thereof.

Of course, it will be apparent to those skilled in the art from this disclosure that various other types of mounting mechanisms or assemblies can be utilized as needed and/or desired. Since the cable brake discs 12a and 12b are identical to each other, only the cable disc brake 12a will be discussed and illustrated in detail herein.

Figure 7:
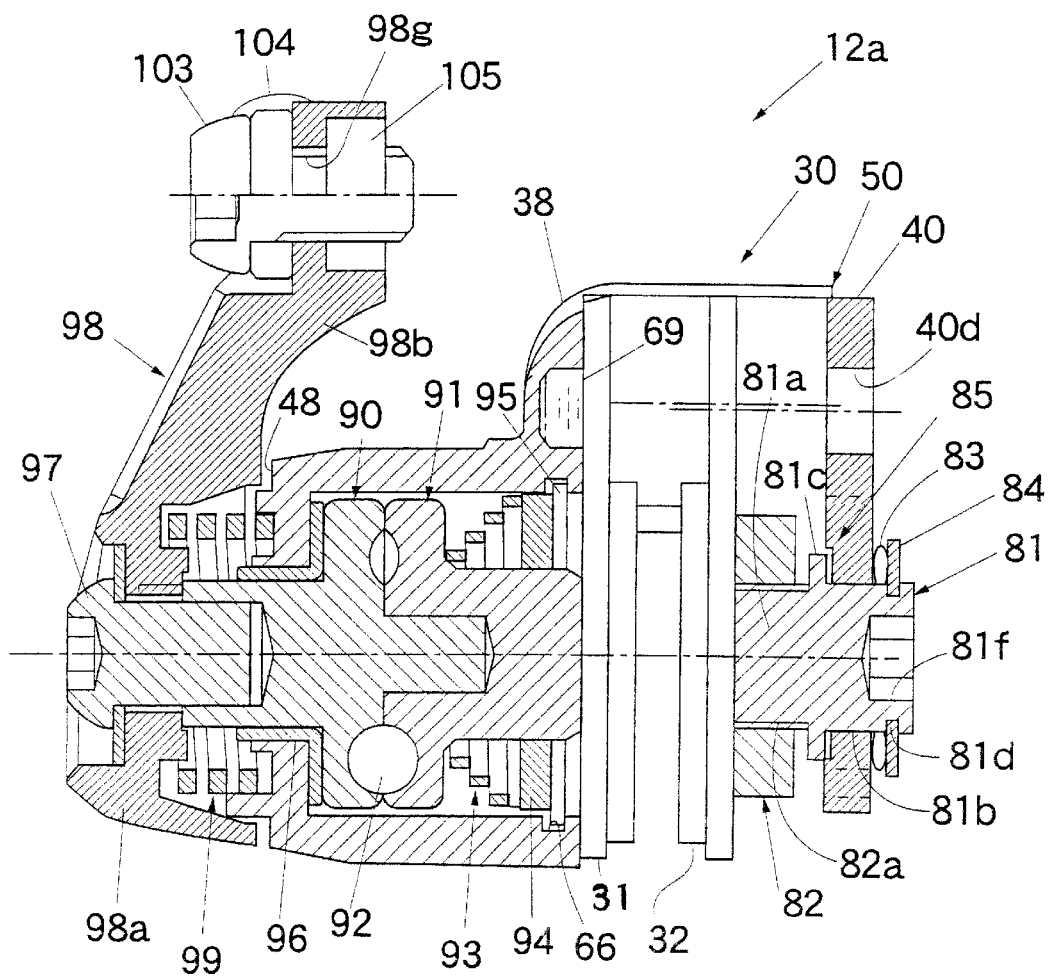
FIG. 7 is a partial longitudinal cross-sectional view of the cable disc brake as viewed along section lines 7—7 of FIG. 5.
Figure 8:
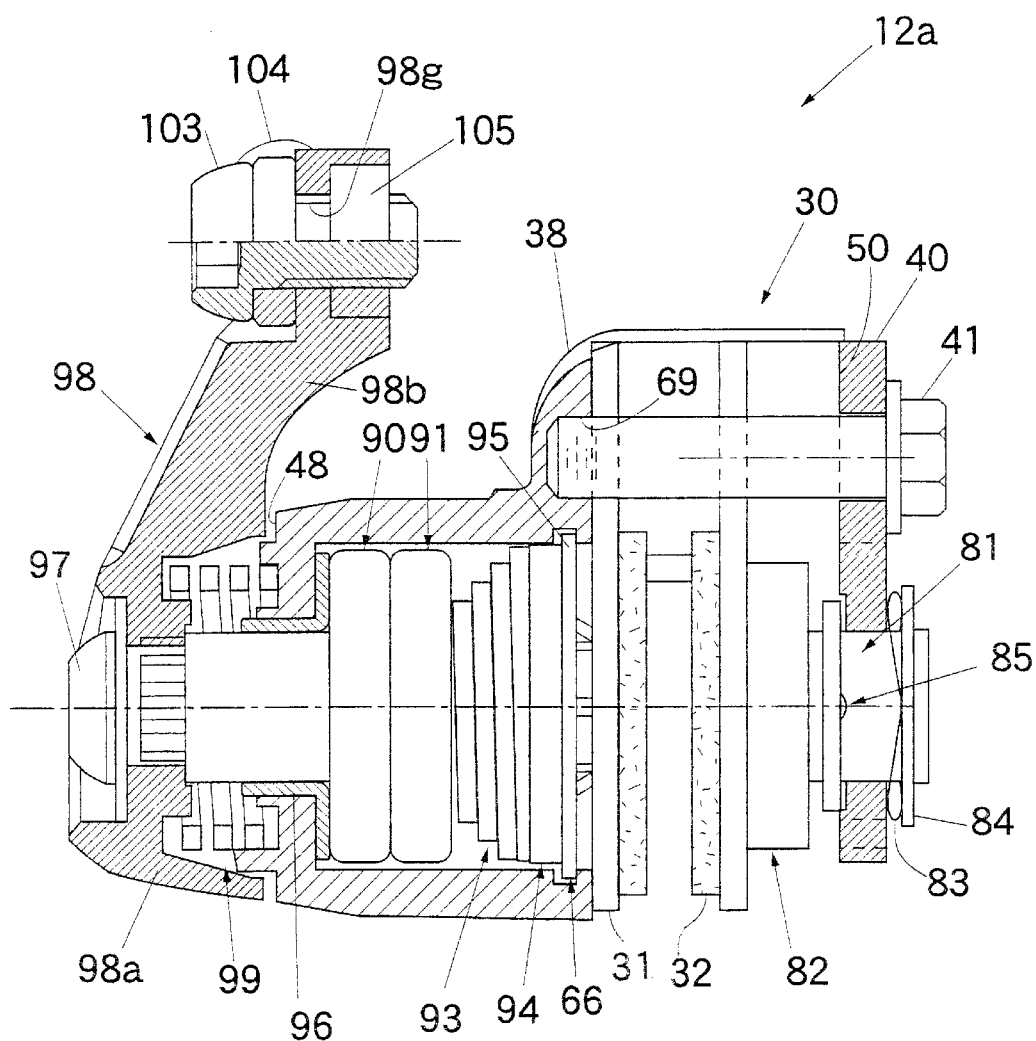
FIG. 8 is a partial longitudinal cross-sectional view, similar to FIG. 7, of the cable disc brake as viewed along section lines 7—7 of FIG. 5, but with selected parts shown in elevation.

Basically, as seen in FIGS. 7 and 8, the cable disc brake 12a includes a caliper housing 30, a pair of brake pads or friction members 31 and 32, a disc brake pad adjustment mechanism 33, a cam assembly 34 and an actuating assembly 36. The cam assembly 34 and the actuating assembly 36 together form a cable actuated mechanism that moves the brake pads 31 and 32 between a release position and a braking position. The caliper housing 30 is mounted to the frame 13 of the bicycle 10 via the bracket 27a and the bolts 28a. The brake pads 31 and 32 are movably coupled to the caliper housing 30 to move between the release position and the braking position via the cam assembly 34 and the actuating assembly 36 (cable actuated mechanism). In the release position, the pads 31 and 32 are spaced from the disc brake rotor 20a to allow free rotation thereof. In the braking position, the brake pads 31 and 32 are pressed against the sides of the disc brake rotor 20a to stop rotation of the bicycle wheel 16a and the disc brake rotor 20a.

Turning to FIGS. 5–14, the caliper housing 30 basically includes an outside caliper housing portion 38 and an inside caliper housing portion 40 that are fixedly coupled together by a pair of bolts 41. When the caliper housing portions 38 and 40 are coupled together, an internal cavity is formed for movably supporting the brake pads 31 and 32 and the cam assembly 34, as discussed below. The caliper housing portions 38 and 40 are preferably constructed of a hard, rigid material, such as a metallic material. Of course, other suitable materials can be utilized for the caliper housing portions 38 and 40.

Figure 9:
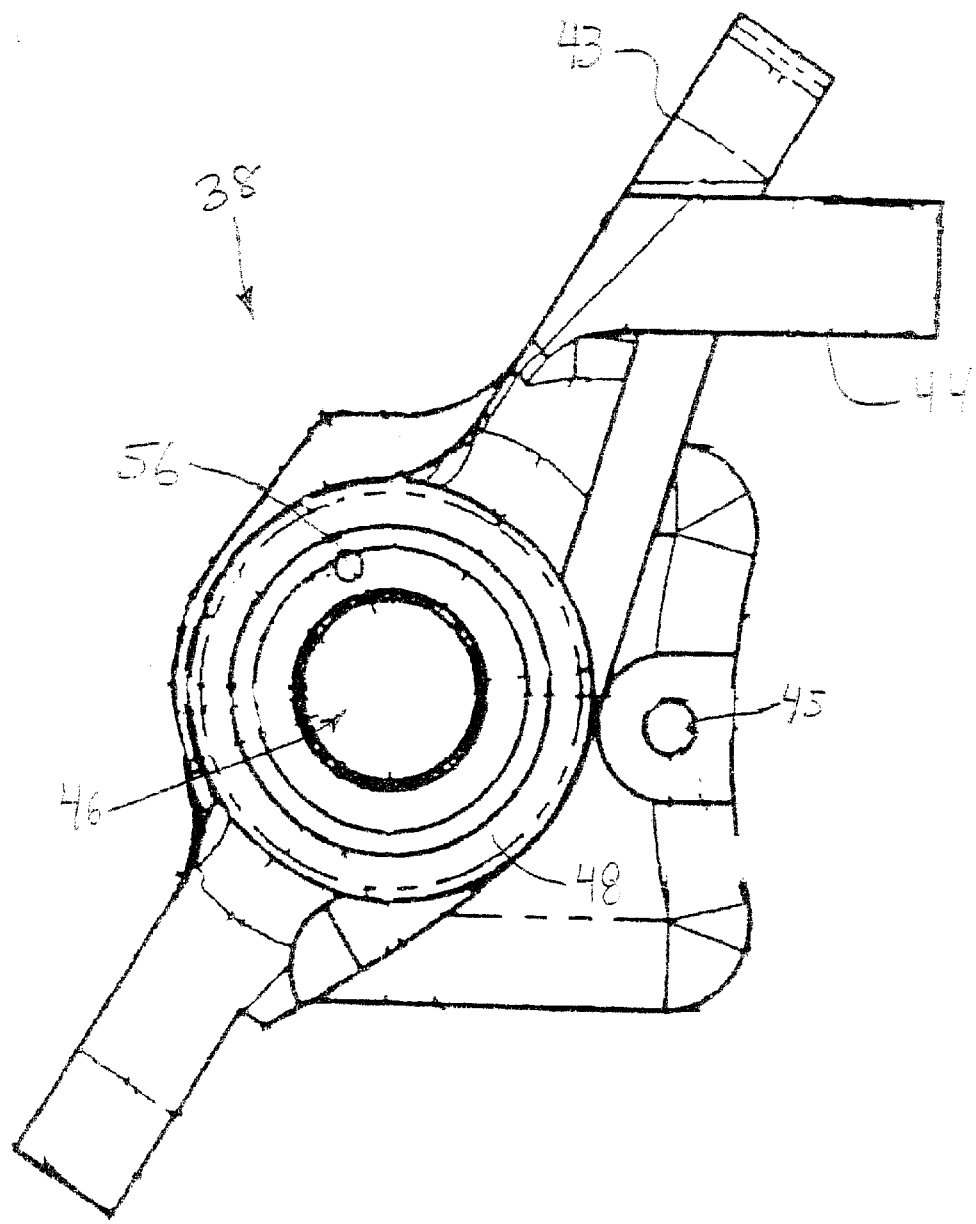
FIG. 9 is an elevational view of the exterior side of the outside caliper housing portion of the cable disc brake illustrated in FIGS. 5–8.
Figure 10:
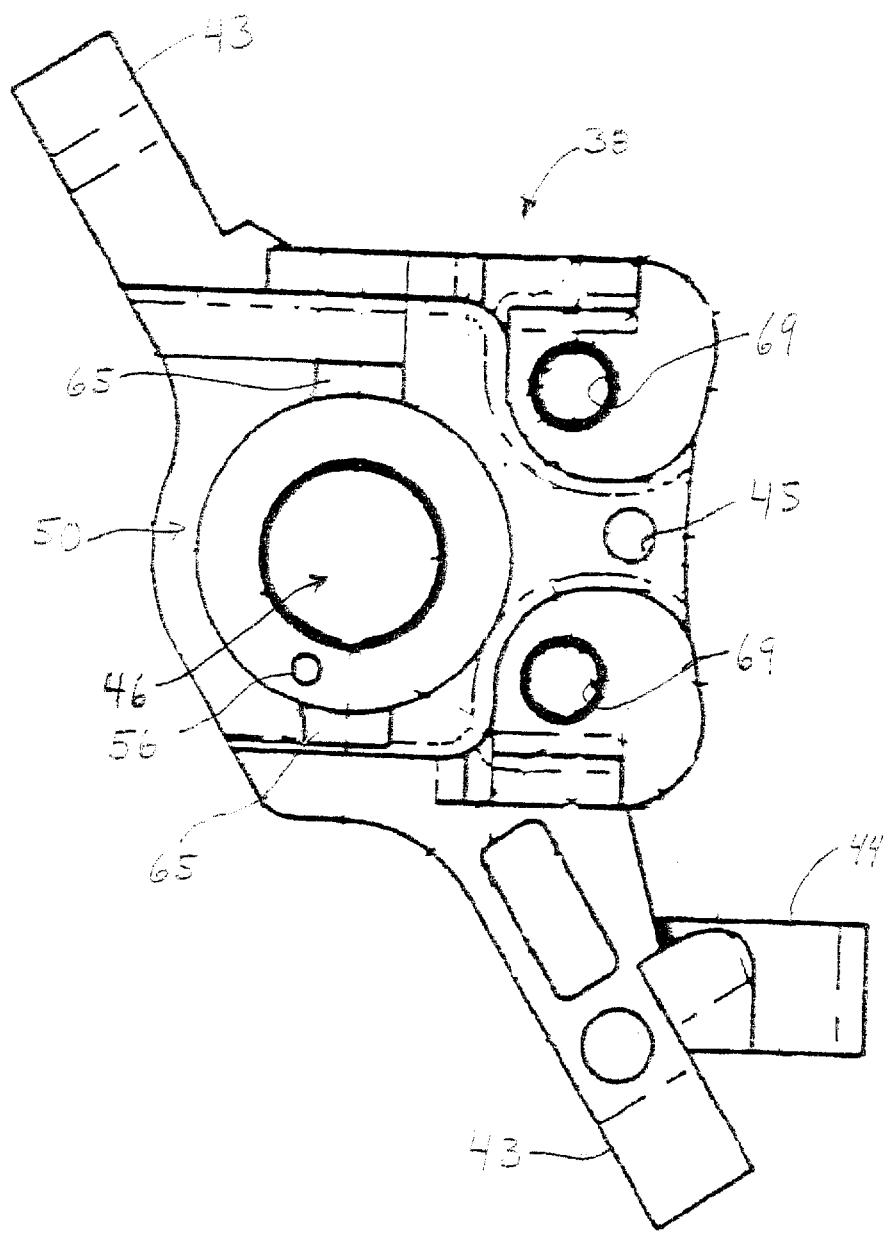
FIG. 10 is an elevational view of the interior side of the outside caliper housing portion illustrated in FIG. 9.
Figure 11:
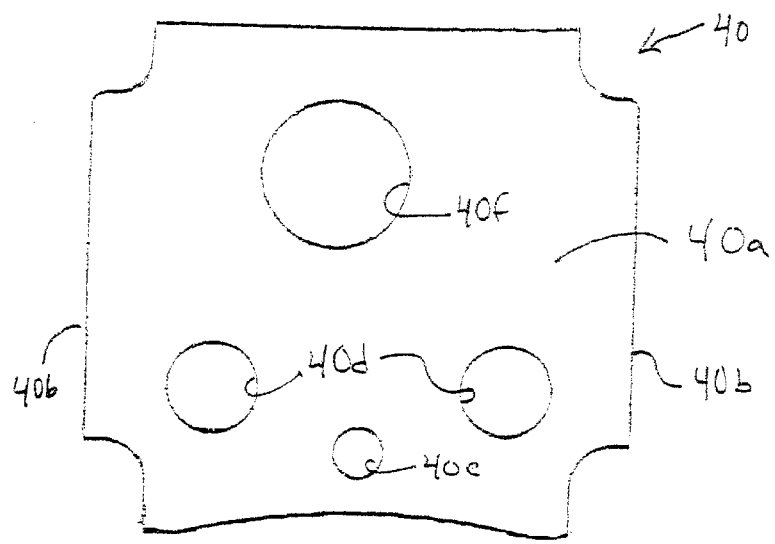
FIG. 11 is an elevational view of the exterior side of the inside caliper housing portion of the cable disc brake illustrated in FIGS. 5–8.
Figure 12:
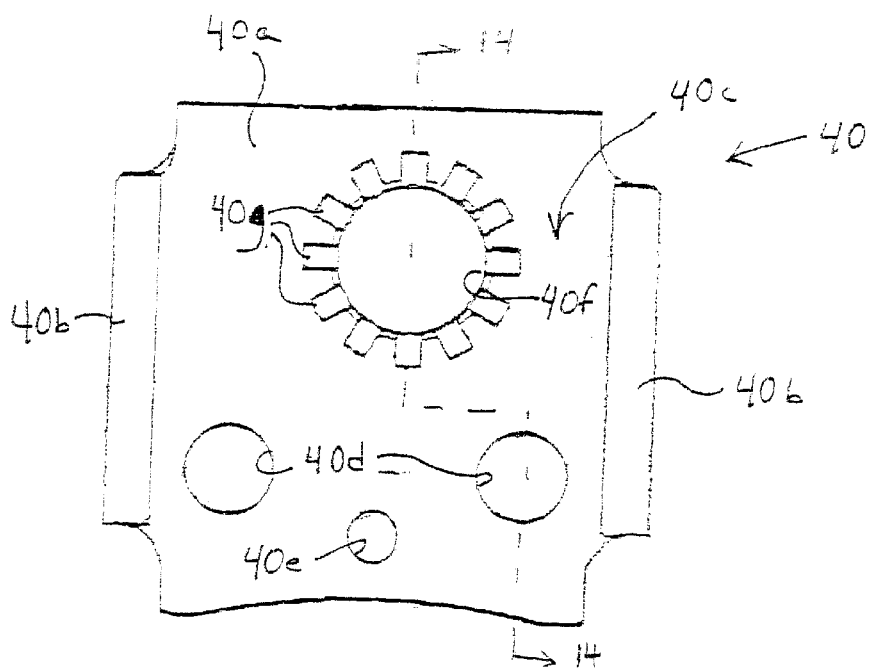
FIG. 12 is an elevational view of the interior side of the inside caliper housing portion illustrated in FIG. 11.
Figure 13:
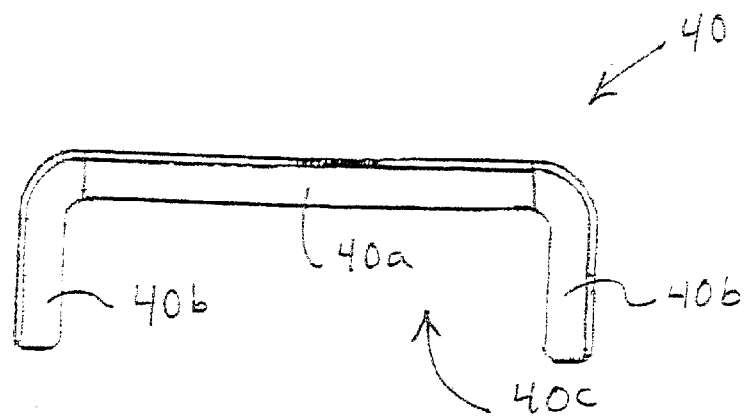
FIG. 13 is a top plan view of the inside caliper housing portion illustrated in FIGS. 11 and 12.
Figure 14:
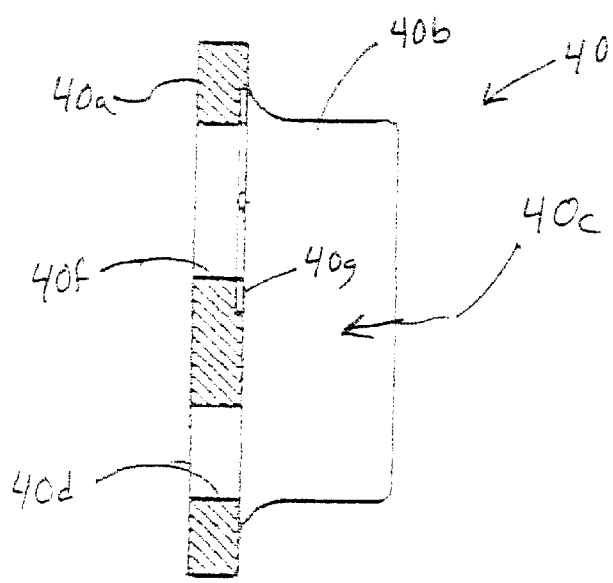
FIG. 14 is a cross-sectional view of the inside caliper housing portion illustrated in FIGS. 11–13 as viewed along section lines 14—14 of FIG. 12.
Figure 18:
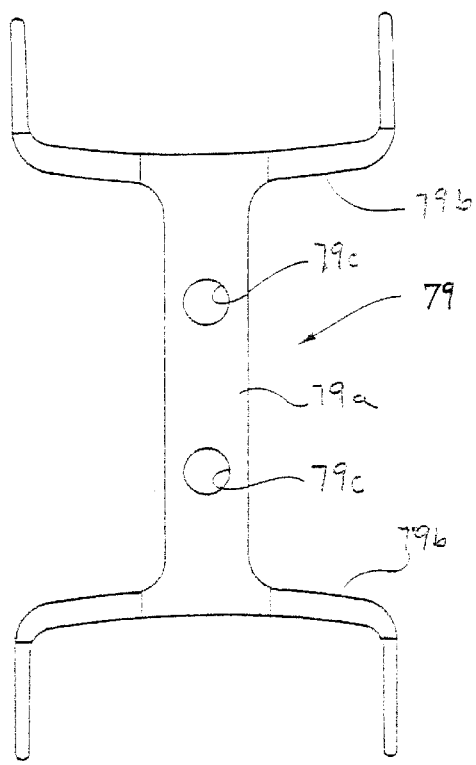
FIG. 18 is an elevational view of the pad spring prior to bending for the cable disc brake illustrated in FIGS. 5–8.
Figure 19:
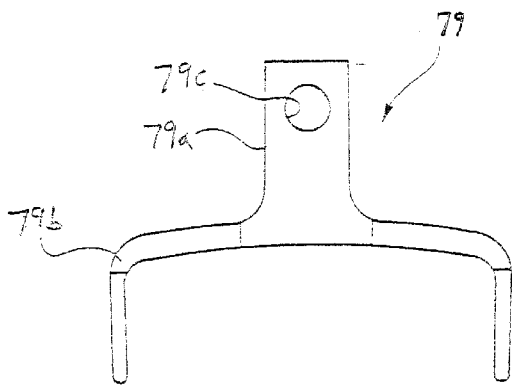
FIG. 19 is a side elevational view of the pad spring illustrated in FIG. 18 for the cable disc brake illustrated in FIGS. 5–8.
Figure 20:
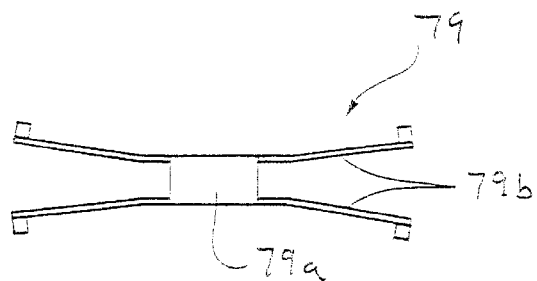
FIG. 20 is a top plan view of the pad spring illustrated in FIGS. 18 and 19 for the cable disc brake illustrated in FIGS. 5–8.
Figure 21:
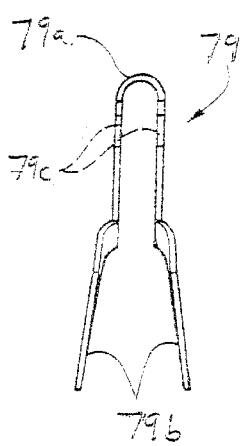
FIG. 21 is an end elevational view of the pad spring illustrated in FIGS. 18–20 for the cable disc brake illustrated in FIGS. 5–8.
Figure 30:
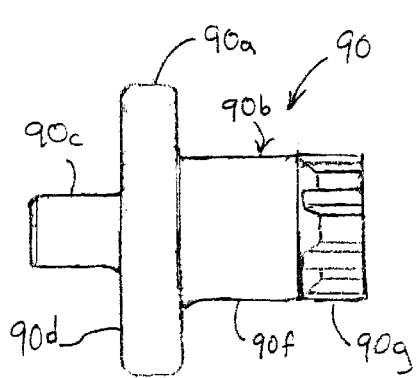
FIG. 30 is a side elevational view of the input cam for the cable disc brake illustrated in FIGS. 5–8.
Figure 31:
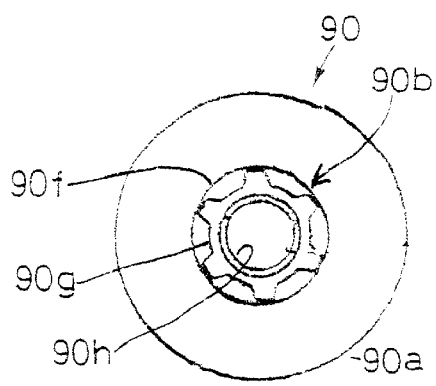
FIG. 31 is an end elevational view of the input cam illustrated in FIG. 30 for the cable disc brake illustrated in FIGS. 5–8.
Figure 32:
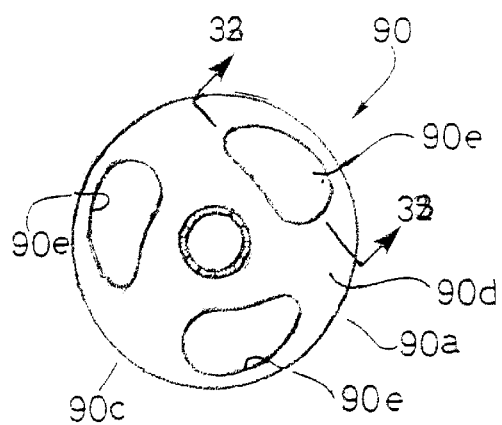
FIG. 32 is an end elevational view of the input cam illustrated in FIGS. 30 and 31 for the cable disc brake illustrated in FIGS. 5–8.
Figure 33:
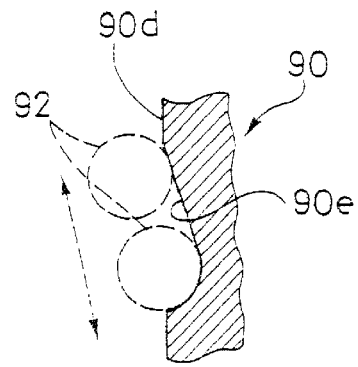
FIG. 33 is a partial, cross-sectional view of the input cam illustrated in FIGS. 30–32 as viewed along section lines 25—25 of FIG. 32.
Figure 34:
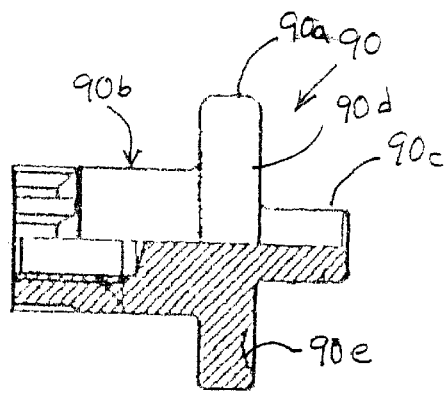
FIG. 34 is a partial, longitudinal cross-sectional view of the input cam illustrated in FIGS. 30–33 for the cable disc brake illustrated in FIGS. 5–8.

As seen in FIGS. 9 and 10, the outside caliper housing portion 38 basically has a pair of mounting flanges 43 and a cable support flange 44. The outside caliper housing portion 38 has a pad support bore 45 extending in a longitudinal direction and an axially extending internal bore 46 that extends longitudinally between a first open end 48 and a second open end 50 of the outside caliper housing portion 38. The pad support bore 45 is utilized to support the brake pads 31 and 32 on the caliper housing 30 as discussed below.

Basically, the first end 48 of the outside caliper housing portion 38 has the actuating assembly 36 coupled thereto, as discussed below. Preferably, the end surface of the first end 48 of the outside caliper housing portion 38 has at least one bore 56 that are adapted to receive a part of the actuating assembly 36, as discussed below. The internal bore 46 also has a pair of longitudinal slots 65 and an annular groove 66 formed therein. The slots 65 that are spaced 180° apart and divide the annular groove 66 into two sections.

The second end 50 of the outside caliper housing portion 38 is provided with a pair of threaded bores 69 for receiving the bolts 41 to secure the left and inside caliper housing portions 38 and 40 together. The second end 50 of the outside caliper housing portion 38 contacts the right brake pad 32.

As seen in FIGS. 2 and 3, the cable support member or flange 44 has a threaded hole 72 therein for receiving a cable adjusting bolt 73 of the cable adjusting unit 26a as seen in FIGS. 2 and 3. The cable adjusting unit 26a adjusts the relative tension between the outer casing 24a and the inner wire 25a.

Turning now to FIGS. 11–14, the inside caliper housing portion 40 is fixedly coupled to the second end 50 of the outside caliper housing portion 38 by the bolts 41. The inside caliper housing portion 40 has the disc brake pad adjustment mechanism 33 coupled thereto for axially moving the right brake pad 32 as explained below.

Basically, the inside caliper housing portion 40 is a U-shaped member having a central mounting section 40a and a pair of laterally spaced restraining sections 40b. The inside caliper housing portion 40 substantially closes off the open end of the second end 50 of the outside caliper housing portion 38, except for a slot for accommodating the disc brake rotor 20a. The laterally spaced restraining sections 40b extend substantially perpendicular to the central mounting section 40a to form a brake pad and adjusting plate receiving area 40c. This receiving area 40c is shaped to accommodate the periphery of the right brake pad 32 such that the right brake pad 32 is securely retained against the inner surface of the inside caliper housing portion 40. Thus, this receiving area 40c should be shaped inside such that the right brake pad 32 does not rotate. As explained below, this receiving area 40c also restrains rotational movement of a portion of the disc brake pad adjustment mechanism 33.

The inside caliper housing portion 40 has a pair of laterally spaced through bores or bolt holes 40d for receiving the bolts 41 therein. Also, the central mounting section 40a of the inside caliper housing portion 40 has an assembly pin hole or bore 40e for receiving the pad assembly pin 77 therein. Preferably, as seen in FIG. 17, the pad assembly pin 77 is a cotter pin. Finally, the central mounting section 40a of the inside caliper housing portion 40 has an opening or hole 40f for coupling the disc brake pad adjustment mechanism 33 thereto. The central mounting section 40a has a plurality (twelve) of grooves 40g that are located around the opening or hole 40f Referring to FIGS. 15 and 16, the left and right brake pads 31 and 32 are substantially identical to each other and can preferably be interchanged with each other. Thus, only the right brake pad 32 will be discussed in detail herein. As seen in FIGS. 15 and 16, the right brake pad 32 includes a rigid support plate 32a and an arcuate portion of friction material 32b attached to the support plate 32a for engaging the brake rotor 20a. The rigid support plate 32a has a mounting tab with a bore 32c therein for receiving the pad assembly pin therethrough. When the right brake pad 32 is mounted on the pad assembly pin 77, the right brake pad 32 can move axially on the pad assembly pin 77, but cannot rotate due to the bolts 41 that extend between the left and inside caliper housing portions 38 and 40.

As seen in FIGS. 18–21, a pad spring 79 is provided between the left and right brake pads 31 and 32 to bias them apart. The pad spring 79 is preferably constructed of a thin resilient material, such as a spring steel. The pad spring 79 has a central connecting portion 79a and a pair of biasing portions 79b extending outwardly from opposite ends of the connecting portion 79a. The connecting portion 79a is preferably an inverted U-shaped member with a pair of axially aligned holes 79c that receive the pad pin 77. The biasing portions 79b are also inverted U-shaped members that diverge outwardly to their free ends relative to a center line bisecting the connecting portion 79a.

Figure 6:
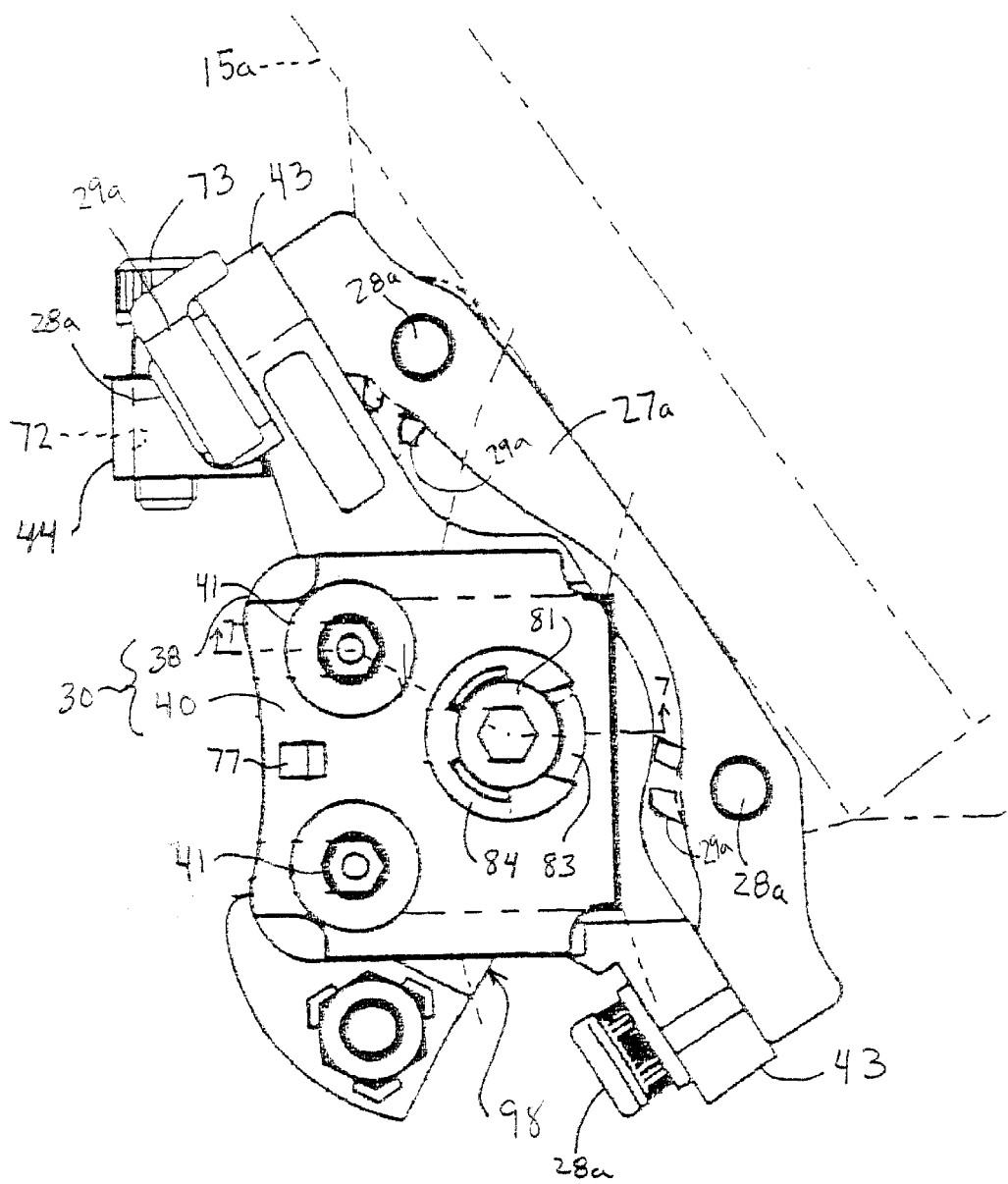
FIG. 6 is an enlarged inside elevational view of the cable disc brake illustrated in FIG. 5.

As seen in FIGS. 6–8, the disc brake pad adjustment mechanism 33 is coupled to the inside caliper housing portion 40 for axially moving the right brake pad 32 on the pad assembly pin 77 towards the left brake pad 31. Basically, the disc brake pad adjustment mechanism 33 comprises an adjusting axle or member 81, an adjusting plate 82, an adjustment biasing member or spring 83 and a retaining member or clip 84. The adjusting axle 81 is movably coupled to the central mounting section 40c of the caliper housing portion 40 to rotate about a longitudinal axis of the adjusting axle 81. The adjusting plate 82 is coupled to the adjusting axle 81 to move axially along the longitudinal axis of the adjusting axle 81 upon rotation of the adjusting axle 81 relative to the caliper housing portion 40. The adjustment biasing member or spring 83 is preferably a spring washer that is operatively disposed between the exterior surface of the central mounting portion 40a of the caliper housing portion 40 and the retaining member or e-ring 84 of the adjusting axle 81. Accordingly, the adjustment biasing member or spring 83 is arranged to axially urge a portion of the adjusting axle 81 against the interior surface of the central mounting portion 40c of the caliper housing portion 40. The adjusting axle 81 and the caliper housing portion 40 is configured with an indexing arrangement 85 therebetween to selectively retain the adjusting axle 81 in a predetermined angular position along the longitudinal axis of the adjusting axle 81 relative to the caliper housing portion 40.

Basically, as seen in FIGS. 22 and 23, the adjusting axle 81 has a threaded portion 81a located at one axial end and a shaft portion 81b located at a second axial end with an annular flange 81c located between the threaded portion 81a and the shaft portion 81b. The threaded portion 81a has threads for threadedly engaging the adjusting plate 82 so that rotational movement of the adjusting axle 81 is converted to axial movement of the adjusting plate 82. The shaft portion 81b of the adjusting axle 81 extends through the opening or hole 78 in the central mounting section 40a of the inside caliper housing portion 40. The free end of the shaft portion 81b of the adjusting axle 81 has an annular groove 81d for receiving the retaining member or clip 84 therein such that the shaft portion 81b of the adjusting axle 81 is retained within the opening or hole 78 of the central mounting section 40a of the inside caliper housing portion 40.

As seen in FIGS. 7, 8, 26 and 27, the adjustment biasing member or spring 83 is preferably a spring washer that is mounted on the shaft portion 81b of the adjusting axle 81 between the exterior surface of the central mounting portion 40c of the inside caliper housing portion 40 and the retaining member 84 such that the annular flange 81c is biased against the interior surface of the central mounting section 40a of the inside caliper housing portion 40.

The annular flange 81c of the adjusting axle 81 extends radially from the longitudinal axes of the adjusting axle 81. The side of the annular flange 81c that faces the interior surface of the central mounting section 40a of the inside caliper housing portion 40 has four projections extending in a longitudinal direction. These projections 81e are equally spaced apart on the annular flange 81c. Preferably, there are four projections 81e that are spaced ninety degrees apart. These projections 81e together with the grooves 40g form the indexing mechanism 85. Specifically, these projections 81e engage the grooves 40g that are formed in the central mounting section 40a of the inside caliper housing portion 40. Specifically, the grooves 41g are located around the opening or hole 78 that receives the adjusting axle 81. Accordingly, the projections 81e selectively engage the grooves 40g to selectively retain the adjusting axle 81 in a predetermined angular position relative to the inside caliper housing portion 40.

The free end of the shaft portion 81b has a blind bore 81f for receiving a tool to rotate the adjusting axle 81. This blind bore 81f is preferably a hexagon in transfer scroll section for receiving a conventional tool to rotate the adjusting axle 81 about its longitudinal axle.

As seen in FIGS. 24 and 25, the adjusting plate 82 is preferably a rectangular member having a centrally located threaded bore or hole 82a that threadedly receives a threaded portion 81a of the adjusting axle 81. Thus, rotation of the adjusting axle 81 causes the adjusting plate to move axially along the longitudinal axes of the adjusting axle 81. Specifically, rotational movement of the axle plate 82 is prevented due to the restraining sections 40b of the inside caliper housing portion 40.

Turning again to FIGS. 7 and 8, the cam assembly 34 basically includes an input cam 90, an output cam 91, a set of rolling members 92, a return spring 93, an output cam rotation stopper 94, a retainer 95 and a bushing 96. Basically, the cam assembly 34 is located in the internal bore 46 of the outside caliper housing portion 38 and is adapted to expand in an axial direction by movement of the actuating assembly 36 via the brake operating mechanism 18a. In particular, rotation of the input cam 90 by the actuating assembly 36 causes the output cam 91 to move in an axial direction against the force of the return spring 93 and the pad spring 79 to compress the left and right brake pads 31 and 32 together against the disc brake rotor 20a.

As seen in FIGS. 30–34, the input cam 90 has a cam member 90a with an operating shaft 90b extending from one end and a guide pin 90c extending outwardly from the other end. The cam member 90a has an axially facing camming surface 90d with three camming slots 90e that receive the three roller members 92 (balls). These camming slots 90e are preferably arcuate slots that curve about the center rotational axis of the input cam 90. These camming slots 90e are ramp-shaped and have an angled bottom surface that is preferably sloped approximately 17° relative to a plane passing perpendicularly through the axis of rotation of the input cam 90. Accordingly, when the input cam 90 is rotated, the rolling members 92 will move in a circumferential direction within the camming slots 90e, such that all of the rolling members 92 are located at the same position within the camming slots 90e to axially move the output cam 91.

The operating shaft 90b is preferably has a first cylindrical section 90f and a second non-cylindrical section 90g. Preferably, the bushing 96 is located around the first cylindrical section 90f as seen in FIGS. 7 and 8. The second non-cylindrical section 90g of the operating shaft 90b is adapted to non-rotatably support a portion of the actuating assembly 36, as discussed below. The free end of the second section 90g of the operating shaft 90b has a threaded bore 90h for receiving a bolt 97 to secure the actuating assembly 36 thereto.

The guide pin 90c is preferably a short pin that is located on the longitudinal axis of the input cam 90 and engages the output cam 91 to ensure smooth movement of the output cam 91 relative to the input cam 90.

Referring now to FIGS. 35–39, the output cam 91 basically includes a camming member 91a and a thrust shaft 91b. The camming member 91a is preferably a cylindrical member having a camming surface 91c facing the camming surface 90d of the input cam 90. The camming surface 91c is preferably provided with three camming slots 91d that are substantially identical to the camming slots 90e of the input cam 90 and are adapted to engage the rolling members 92 to move the output cam 91 axially in response to rotational movement of the input cam 90.

Figure 35:
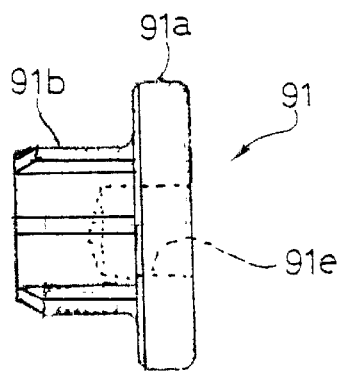
FIG. 35 is a side elevational view of the output cam for the cable disc brake illustrated in FIGS. 5–8.
Figure 36:
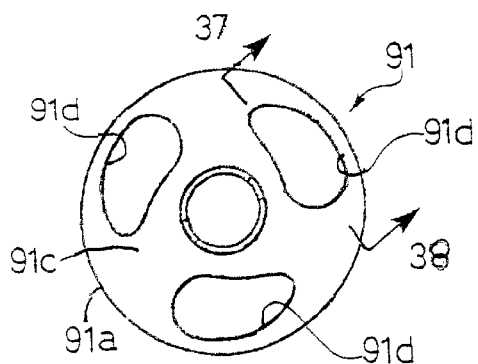
FIG. 36 is an end elevational view of the output cam illustrated in FIG. 35 for the cable disc brake illustrated in FIGS. 5–8.
Figure 37:
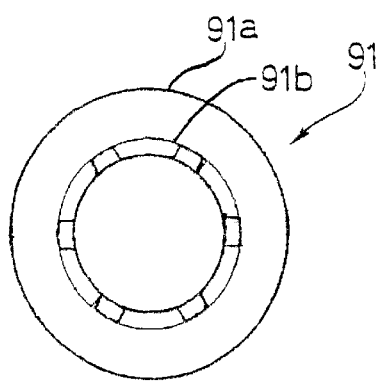
FIG. 37 is an end elevational view of the output cam illustrated in FIGS. 35 and 36 for the cable disc brake illustrated in FIGS. 5–8.
Figure 38:
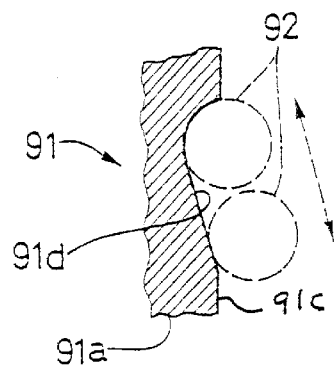
FIG. 38 is a partial, cross-sectional view of the output cam illustrated in FIGS. 35–37 as viewed along section lines 30—30 of FIG. 28.
Figure 39:
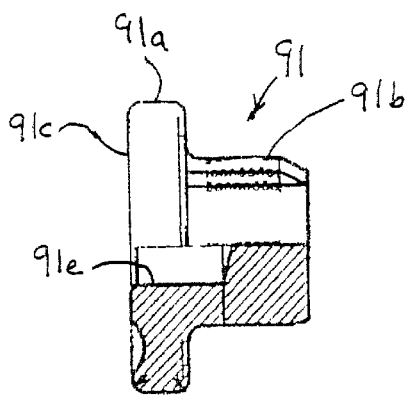
FIG. 39 is a partial, longitudinal cross-sectional view of the output cam illustrated in FIGS. 35–38 for the cable disc brake illustrated in FIGS. 5–8.
Figure 45:
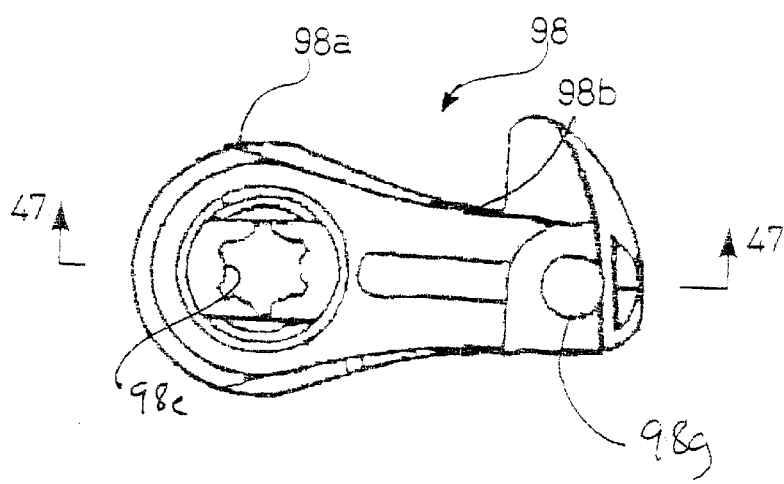
FIG. 45 is an end elevational view of the actuating arm for the cable disc brake illustrated in FIGS. 5–8.
Figure 46:
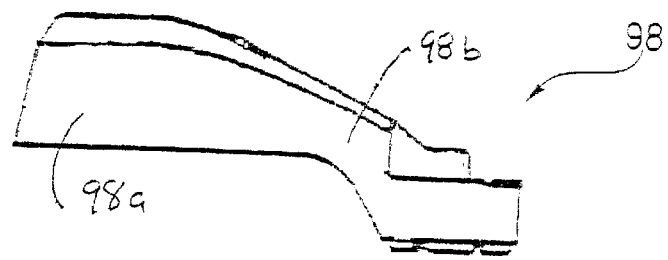
FIG. 46 is a side elevational view of the actuating arm illustrated in FIG. 45 for the cable disc brake illustrated in FIGS. 5–8.
Figure 47:
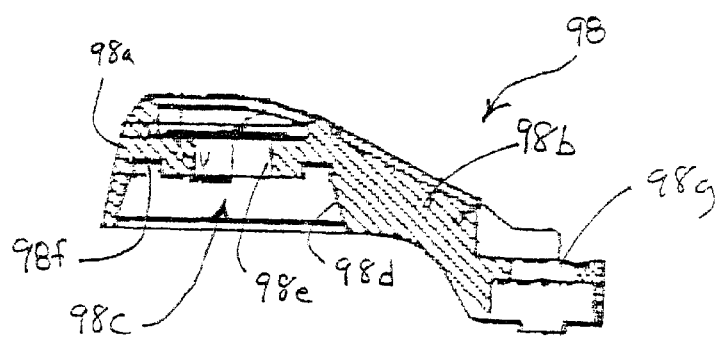
FIG. 47 is a cross-sectional view of the actuating arm illustrated in FIGS. 45 and 46 for the cable disc brake illustrated in FIGS. 5–8 as viewed along section line 47—47 of FIG. 45.
Figure 48:
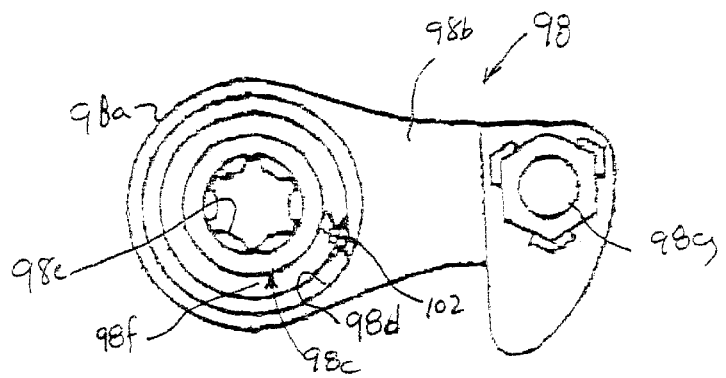
FIG. 48 is an inside end elevational view of the actuating arm illustrated in FIGS. 45–47 for the cable disc brake illustrated in FIGS. 5–8.
Figure 49:
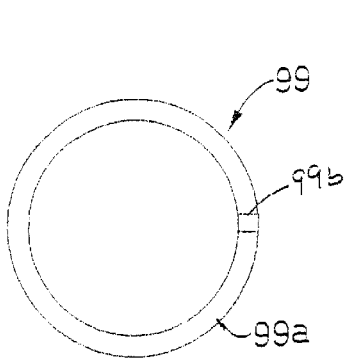
FIG. 49 is an end elevational view of the return spring for the actuating assembly of the front cable disc brake illustrated in FIGS. 5–8.
Figure 50:
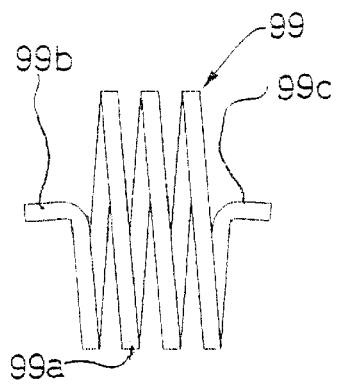
FIG. 50 is a side elevational view of the return spring illustrated in FIG. 49 for the actuating assembly of the cable disc brake illustrated in FIGS. 5–8.
Figure 51:
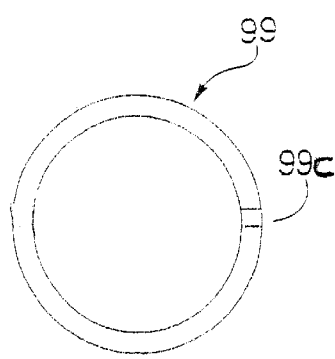
FIG. 51 is an end elevational view of the return spring illustrated in FIGS. 49 and 50 for the actuating assembly of the cable disc brake illustrated in FIGS. 5–8.

As seen in FIGS. 35 and 39, the camming surface 91c of the output cam 91 is also provided with a centrally located blind bore 91e that is adapted to receive the guide pin 90c therein. Preferably, the lengths of the guide pin 90c and the blind bore 91e are such that they do not disengage at any time during the axial movement of the output cam 91 relative to the input cam 90. The thrust shaft 91b of the output cam 91 is preferably a non-circular member that engages the output cam rotation stopper 94, which in turn engages the outside caliper housing portion 38 so that the output cam 91 cannot rotate relative to the outside caliper housing portion 38.

In particular, the rotation stopper 94, as seen in FIGS. 40–42, has an annular center section 94a with a non-circular hole 94b that is adapted to receive the thrust shaft 91b of the output cam 91 therein such that there is no relative rotation therebetween. A pair of tabs 94c are located 180° apart and extend radially outwardly from the center section 94a of the rotation stopper 94. These tabs 94c are received in the slots 65 of the outside caliper housing portion 38 such that the rotation stopper 94 cannot rotate relative to the outside caliper housing portion 38. Thus, since the rotation stopper 94 cannot rotate, the output cam 91 cannot rotate. The rotation stopper 94 is secured on the thrust shaft 91b of the output cam 91 by the retainer 95. The retainer 95 is preferably a C-shaped snap ring. This C-shaped snap ring or retainer 95 is received in the annular groove 66 formed in the internal bore 46 of the outside caliper housing portion 38.

As seen in FIGS. 7 and 8, the return spring 93 for the output cam 91 is located between the output cam 91 and the output cam rotation stopper 94. Preferably, the return spring 93 is a conically-shaped compression spring (as seen in FIGS. 43 and 44) that has an inner diameter at its small end 93a that is substantially equal to the outer width of the thrust shaft 91b of the output cam 91, and an outer diameter at its large end 93b that is substantially equal to or slightly smaller than the inner diameter of the second section 52 of the outside caliper housing portion 38. When the cable disc brake 12a is assembled, the return spring 93 should not be compressed, or only under a slight amount of compression. However, this compression should not be such that it has a biasing force of the return spring 93 that is greater than the biasing force of the pad spring 79. In other words, the biasing force of the output cam return spring 93, relative to the biasing force of the pad spring 79 in its normal rest position, should not compress the pad spring 79.

The actuating assembly 36 basically includes an actuating arm 98 and a return spring 99 that are secured on the first end 48 of the outside caliper housing portion 38 via the bolt 97. In particular, the actuating arm 98 that is fixedly secured to the second section 90g of the operating shaft 90b of the input cam 90 by the bolt 97.

As seen in FIGS. 45–48, the actuating arm 98 has a central mounting portion 98a with an outwardly extending cable mounting portion 98b. The central mounting portion 98a has a step-shaped bore 98c extending therethrough with a first cylindrical section 98d and a second non-cylindrical section 98e. An annular abutment surface 98f is concentrically arranged around the second non-cylindrical section 98e. This abutment surface 98f has at least one bore 102 for mounting the return spring 99 thereto. As seen in FIGS. 7 and 8, the cable mounting portion 98b has a bore 98g at its free end for receiving a clamping bolt 103 with a clamping plate 104 and a nut 105 to secure the end of the inner wire 25a of the cable 19a thereto.

As seen in FIGS. 7, 8 and 49–51, the return spring 99 is preferably a torsion spring having a coil portion 99a with first and second ends 99b and 99c extending in opposite axial directions from the coil portion 99b. The first end 99c is received in the bore 56 of the outside caliper housing portion 38, while the second end 99c of the return spring 99 is received in one of the bores 102 of the actuating arm 98. The first and second ends 99b and 99c are preferably longitudinally aligned with each other in the rest position.

When the cable disc brake 12a is in the assembled position, the return spring 99 normally biases the input cam 90 and the actuating arm 98 to a brake releasing position. When the rider squeezes the brake lever 21a, the inner wire 25a of the cable 19a moves relative to the outer casing 24a of the cable 19a to cause the actuating arm 98 and the input cam 90 to rotate together. This rotation causes the rolling members 92 to move from the deep ends of the camming slots 90e and 91d to the shallow ends of the camming slots 90e and 91d. As the rolling members 92 move within the camming slots 90e and 91d, the output cam 91 is moved in an axial direction against the biasing force of the output cam return spring 93. This axial movement of the output cam 91 causes the left brake pad 31 to move against the urging force of the pad spring 87 to engage the rotor 20a, which is then pressed against the right brake pad 32. This engagement of the brake pads 31 and 32 with the disc brake rotor 20a causes the braking action of the cable disc brake 12a.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A disc brake pad adjustment mechanism comprising:
   a caliper housing portion;
   an adjusting axle movably coupled to said caliper housing portion to rotate about a longitudinal axis of said adjusting axle;
   an adjusting plate being movably coupled to said caliper housing portion by said adjusting axle to move axially along said longitudinal axis of said adjusting axle relative to said caliper housing portion and said adjusting axle upon rotation of said adjusting axle relative to said caliper housing portion about said longitudinal axis of said adjusting axle; and
   a biasing member operatively disposed between said caliper housing portion and said adjusting axle and arranged to axially urge said adjusting axle against said caliper housing portion,
   said adjusting axle and said caliper housing portion being configured with an indexing arrangement therebetween to selectively retain said adjusting axle in a predetermined angular position about said longitudinal axis of said adjusting axle relative to said caliper housing portion such that the indexing arrangement regulates an amount of axial movement of the adjusting plate relative to said caliper housing portion in the axial direction along said longitudinal axis of said adjusting axle during rotation of said adjusting axle.

2. A disc brake pad adjustment mechanism comprising:
   a caliper housing portion;
   an adjusting axle movably coupled to said caliper housing portion to rotate about a longitudinal axis of said adjusting axle;
   an adjusting plate coupled to said adjusting axle to move axially along said longitudinal axis of said adjusting axle upon rotation of said adjusting axle relative to said caliper housing portion; and
   a biasing member operatively disposed between said caliper housing portion and said adjusting axle and arranged to axially urge said adjusting axle against said caliper housing portion,
   said adjusting axle and said caliper housing portion being configured with an indexing arrangement therebetween to selectively retain said adjusting axle in a predetermined angular position about said longitudinal axis of said adjusting axle relative to said caliper housing portion, said indexing arrangement including at least one groove formed in one of said adjusting axle and said caliper housing portion, and at least one projection formed on one of said adjusting axle and said caliper housing portion such that said at least one groove selectively mates with said at least one projection.

3. The disc brake pad adjustment mechanism according to claim 2, wherein said at least one groove is formed in said caliper housing portion, and said at least one projection is formed on said adjusting axle.

4. A disc brake pad adjustment mechanism comprising:

a caliper housing portion;

an adjusting axle movably coupled to said caliper housing portion to rotate about a longitudinal axis of said adjusting axle;

an adjusting plate coupled to said adjusting axle to move axially along said longitudinal axis of said adjusting axle upon rotation of said adjusting axle relative to said caliper housing portion; and a biasing member operatively disposed between said caliper housing portion and said adjusting axle and arranged to axially urge said adjusting axle against said caliper housing portion, said adjusting axle and said caliper housing portion being configured with an indexing arrangement therebetween to selectively retain said adjusting axle in a predetermined angular position about said longitudinal axis of said adjusting axle relative to said caliper housing portion, said indexing arrangement including four grooves formed in one of said adjusting axle and said caliper housing portion, and at least one projection formed on one of said adjusting axle and said caliper housing portion such that said grooves selectively mate with said at least one projection.

5. The disc brake pad adjustment mechanism according to claim 4, wherein said grooves are formed in said caliper housing portion, and said at least one projection is formed on said adjusting axle.

6. The disc brake pad adjustment mechanism according to claim 1, wherein said adjusting axle includes a threaded portion that is threadedly received in a threaded hole formed in said adjusting plate.

7. The disc brake pad adjustment mechanism according to claim 1, wherein said caliper housing portion includes a mounting section and a pair of laterally spaced restraining sections extending from said mounting section to form an adjusting plate receiving area that restrains rotational movement of said adjusting plate relative to said caliper housing portion.

8. A disc brake pad adjustment mechanism comprising:

a caliper housing portion;

an adjusting axle movably coupled to said caliper housing portion to rotate about a longitudinal axis of said adjusting axle;

an adjusting plate coupled to said adjusting axle to move along said longitudinal axis of said adjusting axle upon rotation of said adjusting axle relative to said caliper housing portion; and a biasing member operatively disposed between said caliper housing portion and said adjusting axle and arranged to axially urge said adjusting axle against said caliper housing portion, said adjusting axle and said caliper housing portion being configured with an indexing arrangement therebetween to selectively retain said adjusting axle in a predetermined angular position about said longitudinal axis of said adjusting axle relative to said caliper housing portion, said caliper housing portion including a mounting section and a pair of laterally spaced restraining sections extending from said mounting section to form an adjusting plate receiving area that restrains rotational movement of said adjusting plate relative to said caliper housing portion, said mounting section of said caliper housing portion including a pair of laterally spaced bolt holes located between said restraining sections.

9. The disc brake pad adjusting mechanism according to claim 8, wherein said mounting section of said caliper housing portion includes an assembly pin hole located laterally between said restraining sections.

10. The disc brake pad adjustment mechanism according to claim 7, wherein said biasing member is a spring that is mounted on a shaft portion of said adjusting axle that extends through an opening in said mounting section of said caliper housing portion.

11. The disc brake pad adjustment mechanism according to claim 10, wherein said adjusting axle includes a threaded portion that is threadedly received in a threaded hole formed in said adjusting plate.

12. A disc brake pad adjustment mechanism comprising:

a caliper housing portion;

an adjusting axle movably coupled to said caliper housing portion to rotate about a longitudinal axis of said adjusting axle;

an adjusting plate coupled to said adjusting axle to move axially along said longitudinal axis of said adjusting axle upon rotation of said adjusting axle relative to said caliper housing portion; and a biasing member operatively disposed between said caliper housing portion and said adjusting axle and arranged to axially urge said adjusting axle against said caliper housing portion, said adjusting axle and said caliper housing portion being configured with an indexing arrangement therebetween to selectively retain said adjusting axle in a predetermined angular position about said longitudinal axis of said adjusting axle relative to said caliper housing portion, said caliper housing portion including a mounting section and a pair of laterally spaced restraining sections extending from said mounting section to form an adjusting plate receiving area that restrains rotational movement of said adjusting plate relative to said caliper housing portion, said biasing member being a spring that is mounted on a shaft portion of said adjusting axle that extends through an opening in said mounting section of said caliper housing portion, said adjusting axle including a threaded portion that is threadedly received in a threaded hole formed in said adjusting plate, said indexing arrangement including at least one groove formed in one of said adjusting axle and said mounting section of said caliper housing portion, and at least one projection formed on one of said adjusting axle and said mounting section of said caliper housing portion such that said at least one groove selectively mates with said at least one projection.

13. The disc brake pad adjustment mechanism according to claim 12, wherein said at least one groove is formed in said mounting section of said caliper housing portion, and said at least one projection is formed on a radially extending flange of said adjusting axle.

14. The disc brake pad adjustment mechanism according to claim 12, wherein said adjusting axle includes a retaining member removably coupled to said shaft portion of said adjusting axle to retain said biasing member on said shaft portion of said adjusting axle between said retaining member and an exterior surface of said mounting section of said caliper housing portion.

15. The disc brake pad adjustment mechanism according to claim 14, wherein said mounting section of said caliper housing portion includes a pair of laterally spaced bolt holes located laterally between said restraining sections.

16. The disc brake pad adjustment mechanism according to claim 15, wherein said mounting section of said caliper housing portion includes an assembly pin hole located laterally between said restraining sections.

17. A disc brake pad adjustment mechanism comprising:

a caliper housing portion;

an adjusting axle movably coupled to said caliper housing portion to rotate about a longitudinal axis of said adjusting axle;

an adjusting plate coupled to said adjusting axle to move axially along said longitudinal axis of said adjusting axle upon rotation of said adjusting axle relative to said caliper housing portion; and a biasing member operatively disposed between said caliper housing portion and said adjusting axle and arranged to axially urge said adjusting axle against said caliper housing portion, said adjusting axle and said caliper housing portion being configured with an indexing arrangement therebetween to selectively retain said adjusting axle in a predetermined angular position about said longitudinal axis of said adjusting axle relative to said caliper housing portion, said caliper housing portion including a mounting section and a pair of laterally spaced restraining sections extending from said mounting section to form an adjusting plate receiving area that restrains rotational movement of said adjusting plate relative to said caliper housing portion, said biasing member being a spring that is mounted on a shaft portion of said adjusting axle that extends through an opening in said mounting section of said caliper housing portion, said adjusting axle including a threaded portion that is threadedly received in a threaded hole formed in said adjusting plate, said indexing arrangement including twelve grooves formed in one of said adjusting axle and said caliper housing portion, and four projections formed on one of said adjusting axle and said mounting section of said caliper housing portion such that said grooves selectively mate with said projections.

18. The disc brake pad adjustment mechanism according to claim 17, wherein said grooves are formed in said mounting section of said caliper housing portion, and said projections are formed on a radially extending flange of said adjusting axle.

19. The disc brake pad adjustment mechanism according to claim 18, wherein said adjusting axle includes a retaining member removably coupled to said shaft portion of said adjusting axle to retain said biasing member on said shaft portion of said adjusting axle between said retaining member and an exterior surface of said mounting section of said caliper housing portion.

20. The disc brake pad adjustment mechanism according to claim 19, wherein said retaining member is an E-shaped ring that is located in a groove of said shaft portion of said adjusting axle.

21. A cable disc brake comprising:

a caliper housing;

a first friction pad movably coupled to said caliper housing between a release position and a braking position;

a second friction pad coupled to said caliper housing and arranged substantially parallel to said first friction pad to form a rotor receiving slot therebetween;

a friction pad biasing member operatively disposed to normally urge said first and second friction pads apart to said release position;

a cable actuated mechanism movably coupled to said caliper housing to move said first friction pad from said release position towards said second friction pad to said braking position; and a disc brake pad adjustment mechanism operatively coupled to said caliper housing to move said second friction pad relative to said first friction pad to adjust said rotor receiving slot, said disc brake pad adjustment mechanism including an adjusting axle movably coupled to said caliper housing to rotate about a longitudinal axis of said adjusting axle;

an adjusting plate being movably coupled to said caliper housing by said adjusting axle to move axially along said longitudinal axis of said adjusting axle relative to said caliper housing and said adjusting axle such that said second friction pad moves relative to said first friction pad to adjust said rotor receiving slot upon rotation of said adjusting axle relative to said caliper housing about said longitudinal axis of said adjusting axle; and an adjustment biasing member operatively disposed between said caliper housing and said adjusting axle and arranged to axially urge said adjusting axle against said caliper housing, said adjusting axle and said caliper housing being configured with an indexing arrangement therebetween to selectively retain said adjusting axle in a predetermined angular position about said longitudinal axis of said adjusting axle relative to said caliper housing such that the indexing arrangement regulates an amount of axial movement of the adjusting plate relative to said caliper housing in the axial direction along said longitudinal axis of said adjusting axle during rotation of said adjusting axle.

22. The cable disc brake according to claim 21, wherein said cable actuated mechanism includes a manually operated cam assembly.

23. A cable disc brake comprising:
a caliper housing;
a first friction pad movably coupled to said caliper housing between a release position and a braking position;
a second friction pad coupled to said caliper housing and arranged substantially parallel to said first friction pad to form a rotor receiving slot therebetween;
a friction pad biasing member operatively disposed to normally urge said first and second friction pads apart to said release position;
a cable actuated mechanism movably coupled to said caliper housing to move said first friction pad from said release position towards said second friction pad to said braking position; and
a disc brake pad adjustment mechanism operatively coupled to said caliper housing to move said second friction pad relative to said first friction pad to adjust said rotor receiving slot, said disc brake pad adjustment mechanism including
an adjusting axle movably coupled to said caliper housing to rotate about a longitudinal axis of said adjusting axle;
an adjusting plate coupled to said adjusting axle to move said second friction pad relative to said first friction pad to adjust said rotor receiving slot upon rotation of said adjusting axle relative to said caliper housing; and
an adjustment biasing member operatively disposed between said caliper housing and said adjusting axle and arranged to axially urge said adjusting axle against said caliper housing,
said adjusting axle and said caliper housing being configured with an indexing arrangement therebetween to selectively retain said adjusting axle in a predetermined angular position about said longitudinal axis of said adjusting axle relative to said caliper housing,
said indexing arrangement including at least one groove formed in one of said adjusting axle and said caliper housing, and at least one projection formed on one of said adjusting axle and said caliper housing such that said at least one groove selectively mates with said at least one projection.

24. The cable disc brake according to claim 23, wherein said at least one groove is formed in said caliper housing, and said at least one projection is formed on said adjusting axle.

25. A cable disc brake comprising:
a caliper housing;
a first friction pad movably coupled to said caliper housing between a release position and a braking position;
a second friction pad coupled to said caliper housing and arranged substantially parallel to said first friction pad to form a rotor receiving slot therebetween;
a friction pad biasing member operatively disposed to normally urge said first and second friction pads apart to said release position;
a cable actuated mechanism movably coupled to said caliper housing to move said first friction pad from said release position towards said second friction pad to said braking position; and
a disc brake pad adjustment mechanism operatively coupled to said caliper housing to move said second friction pad relative to said first friction pad to adjust said rotor receiving slot, said disc brake pad adjustment mechanism including
an adjusting axle movably coupled to said caliper housing to rotate about a longitudinal axis of said adjusting axle;
an adjusting plate coupled to said adjusting axle to move said second friction pad relative to said first friction pad to adjust said rotor receiving slot upon rotation of said adjusting axle relative to said caliper housing; and
an adjustment biasing member operatively disposed between said caliper housing and said adjusting axle and arranged to axially urge said adjusting axle against said caliper housing,
said adjusting axle and said caliper housing being configured with an indexing arrangement therebetween to selectively retain said adjusting axle in a predetermined angular position about said longitudinal axis of said adjusting axle relative to said caliper housing,
said indexing arrangement including twelve grooves formed in one of said adjusting axle and said caliper housing, and four projections formed on one of said adjusting axle and said caliper housing such that said grooves selectively mate with said projections.

26. The cable disc brake according to claim 25, wherein said grooves are formed in said caliper housing, and said projections are formed on said adjusting axle.

27. The cable disc brake according to claim 21, wherein said adjusting axle includes a threaded portion that is threadedly received in a threaded hole formed in said adjusting plate.

28. A cable disc brake comprising:
a caliper housing;
a first friction pad movably coupled to said caliper housing between a release position and a braking position;
a second friction pad coupled to said caliper housing and arranged substantially parallel to said first friction pad to form a rotor receiving slot therebetween;
a friction pad biasing member operatively disposed to normally urge said first and second friction pads apart to said release position;
a cable actuated mechanism movably coupled to said caliper housing to move said first friction pad from said release position towards said second friction pad to said braking position; and
a disc brake pad adjustment mechanism operatively coupled to said caliper housing to move said second friction pad relative to said first friction pad to adjust said rotor receiving slot, said disc brake pad adjustment mechanism including
an adjusting axle movably coupled to said caliper housing to rotate about a longitudinal axis of said adjusting axle;
an adjusting plate coupled to said adjusting axle to move said second friction pad relative to said first friction pad to adjust said rotor receiving slot upon rotation of said adjusting axle relative to said caliper housing; and
an adjustment biasing member operatively disposed between said caliper housing and said adjusting axle and arranged to axially urge said adjusting axle against said caliper housing, said adjusting axle and said caliper housing being configured with an indexing arrangement therebetween to selectively retain said adjusting axle in a predetermined angular position about said longitudinal axis of said adjusting axle relative to said caliper housing, said caliper housing including a first caliper housing portion containing said cable actuated mechanism, and a second caliper housing portion containing said disc brake pad adjustment mechanism, said second caliper housing portion being releasably secured to said first caliper housing portion.

29. The cable disc brake according to claim 28, wherein said second caliper housing portion including a mounting section and a pair of laterally spaced restraining sections extending from said mounting section to form an adjusting plate receiving area that restrains rotational movement of said adjusting plate relative to said second caliper housing portion.

30. The cable disc brake according to claim 29, wherein said mounting section of said second caliper housing portion is bolted to said first caliper housing portion by at least one bolt.

31. The cable disc brake according to claim 29, wherein said mounting section of said second caliper housing portion includes an assembly pin hole located laterally between said restraining sections with said first and second friction pads movably supported thereon.

32. The cable disc brake according to claim 29, wherein said adjustment biasing member is a spring that is mounted on a shaft portion of said adjusting axle that extends through an opening in said mounting section of said second caliper housing portion.

33. The cable disc brake according to claim 32, wherein said adjusting axle includes a threaded portion that is threadedly received in a threaded hole formed in said adjusting plate.

34. The cable disc brake according to claim 33, wherein said indexing arrangement includes at least one groove formed in one of said adjusting axle and said mounting section of said second caliper housing portion, and at least one projection formed on one of said adjusting axle and said mounting section of said second caliper housing portion such that said at least one groove selectively mates with said at least one projection.

35. The cable disc brake according to claim 34, wherein said at least one groove is formed in said mounting section of said second caliper housing portion, and said at least one projection is formed on a radially extending flange of said adjusting axle.

36. The cable disc brake according to claim 34, wherein said adjusting axle includes a retaining member removably coupled to said shaft portion of said adjusting axle to retain said adjustment biasing member on said shaft portion of said adjusting axle between said retaining member and an exterior surface of said mounting section of said second caliper housing portion.

37. The cable disc brake according to claim 36, wherein said mounting section of said second caliper housing portion is bolted to said first caliper housing portion by at least one bolt.

38. The cable disc brake according to claim 37, wherein said mounting section of said second caliper housing portion includes an assembly pin hole located laterally between said restraining sections with said first and second friction pads movably supported thereon.

39. The cable disc brake according to claim 33, wherein said indexing arrangement includes twelve grooves formed in one of said adjusting axle and said second caliper housing portion, and four projections formed on one of said adjusting axle and said mounting section of said second caliper housing portion such that said grooves selectively mate with said projections.

40. The cable disc brake according to claim 39, wherein said grooves are formed in said mounting section of said second caliper housing portion, and said projections are formed on a radially extending flange of said adjusting axle.

41. The cable disc brake according to claim 40, wherein said adjusting axle includes a retaining member removably coupled to said shaft portion of said adjusting axle to retain said adjustment biasing member on said shaft portion of said adjusting axle between said retaining member and an exterior surface of said mounting section of said second caliper housing portion.

42. The cable disc brake according to claim 41, wherein said retaining member is an E-shaped ring that is located in a groove of said shaft portion of said adjusting axle.

* * * * *